United States Patent [19]

Song et al.

[11] Patent Number: 5,286,501
[45] Date of Patent: Feb. 15, 1994

[54] PETROLEUM WAX-FREE CHEWING GUMS HAVING IMPROVED FLAVOR RELEASE

[75] Inventors: Joo H. Song, Northbrook, Ill.; Michael A. Reed, Merrillville, Ind.

[73] Assignee: Wm. Wrigley Jr. Company, Chicago, Ill.

[21] Appl. No.: 997,732

[22] Filed: Dec. 30, 1992

[51] Int. Cl.$^5$ .............................................. A23G 3/30
[52] U.S. Cl. ................................................ 426/3
[58] Field of Search .................................. 426/3-6

[56] References Cited

U.S. PATENT DOCUMENTS

| | | | |
|---|---|---|---|
| 3,857,965 | 12/1974 | Ream | 426/3 |
| 3,984,574 | 10/1976 | Comollo | 426/4 |
| 4,604,287 | 8/1986 | Glass et al. | 426/5 |
| 5,039,530 | 8/1991 | Yatka et al. | 426/3 |
| 5,085,872 | 2/1992 | Patel et al. | 426/4 |
| 5,087,459 | 2/1992 | Chuu et al. | 426/4 |
| 5,100,678 | 3/1992 | Reed et al. | 426/3 |
| 5,165,943 | 11/1992 | Patel et al. | 426/3 |

FOREIGN PATENT DOCUMENTS 55-160843 11/1980 Japan.

OTHER PUBLICATIONS

"Textbook of Polymer Science", edited by Billmeyer, second edition, John Whiley and Sons, Incorporated, New York, N.Y., copyrighted 1962, 1971, pp. 24-26.
"Polymer Handbook", second edition, edited by Bandrup and Immergut, Chapter 4, entitled Solubility Parameter Values.
Information Disclosure Statement filed Feb. 16, 1989 in regards to Patent Application U.S. Ser. No. 07/267,540, filed Nov. 4, 1988.

*Primary Examiner*—Jeanette Hunter
*Attorney, Agent, or Firm*—Willian Brinks Hofer Gilson & Lione

[57] ABSTRACT

A petroleum wax-free chewing gum with enhanced flavor release, particularly chewing gums with increased perception of breath freshening, are disclosed. Enhanced flavor release is obtained with wax-free chewing gums where the Solubility Parameter, defined as $$\delta = \sqrt{\frac{\rho \Sigma E_i}{M.W}}$$

of at least 5% of the flavoring agent is at least 0.5 units greater than, or less than, the average weighted Solubility Parameter of the gum base used to formulate the wax-free chewing gums of our invention.

The greater the difference in Solubility Parameter of flavoring ingredients to the average weighted Solubility Parameter of the wax-free gum bases, the greater the tendency for enhanced flavor release.

59 Claims, No Drawings

PETROLEUM WAX-FREE CHEWING GUMS HAVING IMPROVED FLAVOR RELEASE

FIELD OF THE INVENTION

The present invention relates to improved chewing gum bases of the type which contain no petroleum waxes and to chewing gum products containing these petroleum wax-free gum bases. The invention emphasizes the use of flavoring ingredients having certain characteristics in these petroleum wax-free gum bases to ensure improved or rapid flavor release of these flavoring ingredients incorporated into the petroleum wax-free chewing gums.

BACKGROUND OF THE INVENTION

U.S. Pat. No. 3,984,574, issued to Comollo, which patent is incorporated herein by reference, discloses abhesive chewing gums and abhesive chewing gum bases where non-tack properties are achieved by eliminating conventional chewing gum base ingredients found to contribute to chewing gum tackiness and by substituting therefore non-tacky ingredients. Specifically, Comollo discovered that three classes of materials account for conventional chewing gum tackiness. These tacky materials were certain natural elastomers, certain resins and the petroleum waxes.

Comollo eliminated natural and certain synthetic elastomers from his chewing gum bases and substituted in their place one or more non-tacky synthetic elastomers such as polyisobutylene, polyisoprene, isobutylene isoprene copolymer, and styrene-butadiene copolymers. Comollo also eliminated the tack producing natural resins and modified natural resins and used instead relatively high amounts of hydrogenated or partially hydrogenated vegetable oils or animal fats. Finally, Comollo completely excluded waxes from the gum bases but substituted polyvinyl acetate, fatty acids, and certain mono and diglycerides of fatty acids.

Comollo did not specifically recognize any particular difference in the release of flavoring agents or flavoring ingredients from his reformulated wax-free gum bases or chewing gums. We have now discovered that certain wax-free chewing gum bases and wax-free chewing gums formulated with these wax-free bases provide for very rapid and perceptually seemingly immediate release of certain flavoring agents. This apparent rapid rate of flavor release is not observed with chewing gums formulated with paraffin waxes, or in general with petroleum waxes. This rapid release is also not observed with certain flavors. We have now determined those characteristics of the flavoring agents and their flavoring ingredients which, when formulated with petroleum wax-free gum bases, lead to rapid release of flavor. When certain flavoring ingredients are selected, these phenomena can lead to wax-free chewing gums having perceived rapid cooling effects and perceived rapid breath freshening.

SUMMARY OF THE INVENTION

The present invention is directed to a wax-free chewing gum base and chewing gums synthesized using these wax-free bases which gum bases/chewing gums are not of the Comollo type. The gum base of the invention includes quantities of synthetic elastomer or natural elastomers, or mixtures thereof, certain elastomer plasticizers, fillers/texturizers, fats, oils and softeners, and which gum base is also free of petroleum waxes, although optionally small amounts of natural waxes may be used in the formulations of this invention.

Other differences between the gum bases of the formulas of this invention and the gum bases of Comollo include the fact that the gum bases of the invention are not limited to the use of non-tack ingredients and may therefore contain, at the formulators' option, certain quantities of natural elastomers, and natural resins. Certain types of elastomer plasticizers which contribute superior chew characteristics as well as some degree of tackiness to the final product are normally included in the petroleum wax-free gum bases of this invention. The gum bases of the invention may also contain such optional quantities of minor ingredients such as colors, dyes, whiteners, antioxidants, pharmaceutical agents, emulsifiers, and the like.

The use of natural elastomers in the gum base compliments certain chewing gum flavors, such as mint oil, by rounding out the otherwise harsh or so-called grassy notes in this flavor agent. The presence of natural elastomers, natural resins and the like, in our gum bases also contributes to improved chewing gum texture and, in certain circumstances, improved flavor retention. This has been taught by Synosky et al. in International Patent Application PCT/US92/09615, filed Nov. 6, 1992 which is a continuation in-part of International Patent Application PCT/US92/01686 filed Mar. 3, 1992, both of which are incorporated herein by reference.

In addition to the above teachings of Synosky et al., we have now discovered that by selecting certain physicochemical characteristics of our wax-free gum bases and combining these characteristics in a relationship with similar characteristics for flavoring ingredients, we can obtain a chewing gum base with no petroleum waxes, and a wax-free chewing gum having rapid release of flavoring ingredients. The rapid release of these flavoring ingredients, if properly selected, enhances the perception of breath freshening and provides pleasurable flavor highlights to the consumer.

ADVANTAGES AND FEATURES OF THE INVENTION

With the foregoing in mind, it is a feature and advantage of the invention to provide a substantially petroleum wax-free chewing gum base and a substantially petroleum wax-free chewing gum, which chewing gum has certain characteristics to enhance flavor release, breath freshening, and such other pleasurable notes as the consumer desires.

It is also an advantage and feature of the invention to provide the manufacturer with physicochemical characteristics, and relationships based on these characteristics, that permit planned preformulation of wax-free chewing gums having rapid flavor releasing properties.

It is also an advantage and feature of this invention to coordinate the use of a calculated Solubility Parameter for at least one, and possibly a series of flavoring ingredients and an average weighted Solubility Parameter for a prescribed gum base in such a way as to provide the manufacturer the option of processing predictably a wax-free chewing gum with rapid flavor release.

It should be understood that the detailed description and examples that follow are illustrative rather than limitative, and the scope of the present invention is defined by the appended claims and equivalents therefor.

DETAILED DESCRIPTION OF THE INVENTION

Definitions

In accordance with this invention, certain definitions are to be used to understand the scope of the invention.

The term "Solubility Parameter", —when used in this application, reflects a meaning indicated in the publication "*Textbook of Polymer Science*", edited by Billmeyer, Second Edition, John Wiley and Sons, Inc., New York, New York, Copyright 1962, 1971, pages 24–26 This text is incorporated herein by reference.

Also, the Second Edition of "*Polymer Handbook*", Edited by Bandrup and Immergut, and published by John Wiley and Sons, Inc., New York, New York in 1975 contains a Chapter IV, entitled, "*Solubility Parameter Values*", edited by H. Burrell, which chapter, beginning on page IV-337 of this handbook, is incorporated herein by reference.

In the above textbook and handbook, procedures and information are given which allow the value of the Solubility Parameter to be calculated for both the elastomer plasticizers and/or elastomers used in the gum base, as well as for each of the ingredients used in the gum bases. This series of calculations can then be averaged and weighted by the percent of each ingredient contained in the gum base. This average weighted Solubility Parameter can then be calculated for each gum base for our wax-free chewing gums. Further examples of the average weighted Solubility Parameter are presented in the tables that follow.

Similarly, the Solubility Parameter can be calculated for each flavoring agent, and for each flavor ingredient contained in each flavoring agent, or any mixtures thereof.

In the absence of strong intramolecular interactions, such as hydrogen bonding, the Solubility Parameter relationships calculated herein lead to the conclusion that wax-free chewing gums using petroleum wax-free gum bases, which bases have an average weighted Solubility Parameter ranging from about 16.0 to about 21.0, can have improved flavor release under certain conditions. These conditions are that at least 5%, and preferably at least 10% (weight percent) of the flavoring agent used has a Solubility Parameter that is at least 0.5 Solubility Parameter Units (S.P.U.) greater than, or less than, and preferably at least 1.0 S.P.U. greater than or less than, the average weighted Solubility Parameter of the wax-free chewing gum base used to formulate the wax-free chewing gum.

The term, S.P.U., as used herein, is a Solubility Parameter Unit, and S.P.U. is defined as either one unit, based on Solubility Parameters in terms of $[cal/cm^3]^{1/2}$/mole, as in Table 1 below, or preferably as 1 unit having the dimensionality of $[Joules/m^3]^{1/2} \times 10^{-3}$/mole.

The term, "wax-free," when used herein, refers to petroleum wax-free. Petroleum waxes are represented by, but not limited to, paraffin waxes. It is to be understood that our petroleum wax-free gum bases and chewing gums can contain, optionally, small amounts, i.e. from about 0.0 to 5.0 weight percent, natural waxes.

Solubility Parameter Measurement

The easiest way to determine the Solubility Parameters for polymers of a known structure is to use the molar attraction constants E presented in Table 1 below.

TABLE 1

Molar attraction constants E, $(cal/cm^3)^{1/2}$/mole (Hoy 1970)*

| Group | E | Group | E |
|---|---|---|---|
| —$CH_3$ | 148 | $NH_2$ | 226.5 |
| —$CH_2$— | 131.5 | —NH— | 180 |
| >CH— | 86 | —N— | 61 |
| >C< | 32 | C≡N | 354.5 |
| $CH_2$= | 126.5 | NCO | 358.5 |
| —CH= | 121.5 | —S— | 209.5 |
| >C= | 84.5 | $Cl_2$ | 342.5 |
| —CH=aromatic | 117 | Cl primary | 205 |
| —C=aromatic | 98 | Cl secondary | 208 |
| —O—ether, acetal | 115 | Cl aromatic | 161 |
| —O—epoxide | 176 | F | 41 |
| —COO— | 326.5 | Conjugation | 23 |
| >C=O | 263 | cis | −7 |
| —CHO | 293 | trans | −13.5 |
| $(CO)_2O$ | 567 | 6-Membered ring | −23.5 |
| —OH→ | 226 | ortho | 9.5 |
| OH aromatic | 171 | meta | 6.5 |
| —H acidic dimer | −50.5 | para | 40 |

*Table 1 Molar attraction constants are given in $[calories/cm^3]^{1/2}$/mole. The Molar attraction constants used to calculate Solubility Parameters in the later tabular presentation are given in $(Joules/m^3)^{1/2} \times 10^{-3}$/mole.

In the above table, which is reproduced from the Billmeyer publication cited above, certain values of E for a particular chemical moiety, such as, for example, the methylene group, —$CH_2$—, are presented. Each moiety contained in an ingredient of our gum bases are summed over the structural configuration of that repeating unit in, for example, the elastomer chain(s) of the gum base. This is then repeated for each separate moiety, and is summed for each different chemical moiety in a molecule to obtain the Solubility Parameter for each ingredient.

Similarly, molecular weights and densities for each ingredient are obtained and used in the calculation for Solubility Parameter for that ingredient. The Solubility Parameter approach to flavors and gum bases is useful, particularly in the absence of strong polymer/solvent or flavoring agent interactions.

Using the techniques outlined in Dr. Billmeyer's "*Textbook of Polymer Science*", above incorporated herein by reference, certain Solubility Parameters have been calculated for flavoring agents, flavor ingredients and for elastomers and other ingredients used to formulate our wax-free gum bases.

The wax-free gum bases are then used to formulate chewing gums, which chewing gums may be bubble gums, specialty gums including pharmaceutical agents and the like, or normal chewing gums.

The key to flavor release is to formulate the wax-free gum bases of our invention with flavoring agents, at least 5 weight percent of which have flavor ingredients having a Solubility Parameter of at least 0.5 S.P.U.s greater than, or less than, the average weighted Solubility Parameter for the wax-free gum bases used in the formulation. Preferably, the flavoring agents used have at least 10 weight percent of ingredients with Solubility Parameter at least 0.5 S.P.U.s greater than, or less than, the average weighted Solubility Parameter for the gum base used to formulate the wax-free chewing gum of this invention. Equally preferable is the use of flavoring agents having at least 5 weight percent, and preferably 10 weight percent, or even 25 weight percent, of ingredients whose Solubility Parameter is at least 1.0 S.P.U.s greater than, or less than, the average weighted Solubility Parameter of the wax-free gum base of the chewing gum.

Our petroleum wax-free flavored chewing gum which has fast release of flavoring agents and flavoring ingredients comprises from about 10 to about 90 weight percent of a wax-free gum base, and preferably from about 15 to about 75 weight percent of a gum base, and from about 0.001 to about 70 weight percent sweetener, from about 0.01 to about 10 weight percent flavoring agents, preferably from about 0.05 to about 7.5 weight percent flavoring agents, and from about 5 to about 75 weight percent binder/bulking agents.

In the above wax-free flavored chewing gums, the flavoring agents comprise at least five weight percent of at least one flavoring ingredient having a Solubility Parameter, $\delta$, calculated by the formula, $$\delta = \sqrt{\frac{\rho \Sigma E_i}{M.W}}$$

wherein this Solubility Parameter for the flavoring ingredient is at least 0.5 S.P. units (S.P.U.s) greater than, or less than, the average weighted Solubility Parameter of the wax-free gum base.

Above, in the formula used to calculate the Solubility Parameter, $\delta$ represents the Solubility Parameter for each ingredient. These ingredients may be selected from one of the flavoring ingredients, or they may be any of the organic compounds including the elastomer, the elastomer plasticizer, the vinyl polymers, and the like, that are used to formulate the gum bases. $\rho$ represents the density of the selected ingredient. Similarly, M.W. represents the molecular weight of the selected ingredient, or, in a polymeric structure, M.W. may be the molecular weight of the repeating unit. $E_i$ is the molar attraction constant for each moiety making up each ingredient for which the Solubility Parameter is being calculated. $\Sigma$ is a summation sign from group theory (see "*Polymer Handbook*" reference).

The molar attraction constants given in Table 1 above are for different chemical moieties making up certain organic molecules, and the sum of the molar attraction constant for each of the moieties making up a molecule, when summed over the structure of the molecule and divided by the molecular weight of the molecule, then multiplied by the density, the total having the square root taken, leads to the Solubility Parameter for that ingredient.

The average weighted Solubility Parameter for the gum bases is the total weighted average for each ingredient in the gum base for its Solubility Parameter times its weighted amount in the formulation, divided by % Base as defined, the results of which are then summed to obtain the average weighted Solubility Parameter for the wax-free gum base. The base gum formulation for which the Solubility Parameter is measured, does not include calculations for inert ingredients such as fillers and the like. This calculation for average weighted Solubility Parameter is set forth in detail in Table 3, which follows later.

In our invention, the petroleum wax-free gum preferably has a wax-free gum base which comprises from about 10 to about 90 weight percent elastomers, from about 1.0 to about 50 weight percent of an elastomer solvent or elastomer plasticizer, from about 0.5 to about 40.0 percent of fillers or texturizers, from about 0.5 to about 40.0 weight percent vinyl polymers, from 1 to 40 weight percent of a combination of fats, oils and other softeners, and from about 0.1 to about 15 weight percent of various ingredients, some optional, including but not limited to emulsifiers, colorants, dyes, whiteners, antioxidants, pharmaceuticals, natural waxes and other ingredients. The natural waxes are optionally present a from about 0.0 to about 5 weight percent, and preferably are not present in our gum bases.

Further, our wax-free gum base preferably has an average weighted Solubility Parameter ranging between about 16.0 and 21.0 S.P.U.s. The preferred dimensionality for Solubility Parameter is $[J/m^3]^{\frac{1}{2}} \times 10^{-3}$/mole, where J=joules and m=meters, but the term used herein for simplicity is S.P.U., meaning 1 $[J/m^3[^{\frac{1}{2}} \times 10^{-3}$/mole.

Preferably, the petroleum wax-free gum has a gum base with an average weighted Solubility Parameter ranging between about 17.0 and about 20.0 S.P.U.s. Most preferably, the petroleum wax-free gum base has an average weighted Solubility Parameter ranging between about 17.5 and about 20.0.

Our petroleum wax-free gums can contain from about 0.01 to about 10 weight percent of at least one flavoring agent within which there is contained at least one flavoring ingredient which has a Solubility Parameter of at least 0.5 S.P.U.s greater than, or less than, the average weighted Solubility Parameter of the gum base. Most preferably, the chewing gum contains a flavoring agent having at least 10 weight percent, or as high as 25 weight percent, ingredient having a Solubility Parameter at least 1.0 S.P.U.s greater than, or less than, the average weighted Solubility Parameter of the gum base.

As the difference in the Solubility Parameter of the flavoring agent and/or its flavoring ingredients increases relative to the averaged weighted Solubility Parameter of the gum base, the chewing gum containing that flavoring agent or flavoring ingredient has a tendency to release the flavoring ingredient faster when the gum is chewed. This rapid release of flavoring ingredient provides the consumer with the impression of higher flavoring and leaves the consumer with the impression of faster and more complete breath freshening, cooling, or the like impression depending upon the flavoring ingredients used. If the flavoring ingredient has a Solubility Parameter at least one S.P.U. greater than, or less than, the average weighted Solubility Parameter of the wax-free gum base, and at least 10 weight percent, or preferably at least 25 weight percent or more, of the flavoring agent has an ingredient having that characteristic, this provides for very rapid flavor release and is a preferred practice of our invention. Most preferred, of course, would be a flavoring agent that has an ingredient at relatively high concentrations, for example, above 10 weight percent of the flavoring agent, preferably around 25 weight percent, which ingredient has a Solubility Parameter at least one S.P.U. greater than, or less than, the average weighted Solubility Parameter of the wax-free gum base.

To provide further examples of our flavoring agents and the flavoring ingredients that are contained in these agents, we present the following table.

TABLE 2

| Solubility Parameters for Flavoring Ingredients | |
|---|---|
| Flavoring Ingredient | $\delta$, Solubility Parameter |
| a) α-pinene | about 14.69 |

TABLE 2-continued

Solubility Parameters for Flavoring Ingredients

| Flavoring Ingredient | δ, Solubility Parameter |
|---|---|
| b) β-pinene | about 14.65 |
| c) α-terpineol | about 17.63 |
| d) p-cymene | about 16.44 |
| e) 1,8-cineol/d-limonene | about 14.94/15.27 |
| f) δ-terpinene | about 15.61 |
| g) l-menthone | about 16.43 |
| h) isomenthone | about 16.43 |
| i) menthofuran | about — |
| j) neomenthol | about 17.74 |
| k) l-menthol | about 17.74 |
| l) pulegone | about 17.28 |
| m) piperitone | about 17.26 |
| n) menthyl acetate | about 15.98 |
| o) caryophyllene | about 16.22 |

As you can see in Table 2, various flavoring ingredients are listed with their calculated Solubility Parameters. These Solubility Parameters generally fall within the range of about 14.0 to about 18.0 $[J/m^3]^{\frac{1}{2}} \times 10^{-3}$ or S.P.U.). Each of these flavoring ingredients are contained in at least one flavoring agent represented by those flavoring agents typically used in the manufacture of chewing gums.

These flavoring agents can include, but are not limited to, essential oils, synthetic flavors or mixtures thereof. The flavoring agents include, but are not limited to, oils derived from plants and fruits such as the citrus oils, the fruit essences, peppermint oil, spearmint oil, other mint oils, clove oil, oil of wintergreen, anise, cinnamon flavorings, and the like. Other artificial flavoring agents and components may also be used, as long as they have Solubility Parameter characteristics which permit formulation with gum bases such that the Solubility Parameter of at least 5% of the flavoring agent is at least ±0.5 S.P.U.s difference from the average weighted Solubility Parameter for the gum base formulated.

In the use of our invention, particularly good results are obtained when ingredients normally found in certain mint oils, such as peppermint, spearmint, and the like, and menthol, are used to formulate a breath freshening gum. This specialty breath freshening gum gives the consumer the impression of freshening or cooling the breath and the mouth by the presence of the various flavoring agents, particularly menthol, formulated into the gums. Of particular interest in these breath freshening gums are those flavoring ingredients selected from the group consisting of d-limonene, l-menthone, isomenthone, neomenthol, l-menthol, menthyl acetate, and 1,8-cineol. Again, these flavoring ingredients can be used in combinations or blends to obtain flavoring agents as long as the flavoring ingredients contained in the flavoring agents are contained therein in at least five weight percent of the flavoring agent, and at least one of the flavoring ingredients so contained has a Solubility Parameter at least 0.5 S.P.U.s, and preferably 1.0 S.P.U.s, greater than, or less than, the average weighted Solubility Parameter of the gum base used to formulate the chewing gum.

Although it is preferred that flavoring agents used in the invention contain at least 5 weight percent, preferably 10 weight percent or higher, of a flavoring ingredient whose Solubility Parameter is at least 0.5, and preferably at least 1.0 S.P.U.s, greater than, or less than, the average weighted Solubility Parameter of the wax-free gum bases of this invention, it is to be understood that flavoring agents, or flavoring ingredients, whose Solubility Parameter is not within the ±0.5, or ±1.0 S.P.U. difference from the average weighted Solubility Parameter of the gum base, may still be used in the chewing gum of the invention. The use, in fact, may contribute to long term flavor release, since these materials having Solubility Parameters within ±0.5, or ±1.0 S.P.U.s of the average weighted Solubility Parameter of the gum base are believed to be more soluble in the gum base, and therefor better retained in the gum base over a period of chewing time.

For rapid release of flavor from the petroleum wax-free chewing gums of our invention, it is only required that at least 5 weight percent, preferably at least 10 weight percent, or higher, of the flavoring agent be one, or more, flavoring ingredients having a Solubility Parameter with the relationships with the average weighted Solubility Parameters of the gum bases used in the chewing gum, as those relationships have been described above.

Additional ingredients are normally formulated with chewing gums and chewing gum bases as outlined above. To describe in further detail what these additional ingredients are, the following information is provided.

Our petroleum wax-free flavored chewing gums normally contain wax-free gum bases having average weighted Solubility Parameters ranging between 16.0 and 21.0, preferably between 17.0 and 20.0, and most preferably between about 17.5 and 20.0 S.P.U.s. These gum bases are contained in the chewing gum at from about 10 to about 90 weight percent, preferably about 15 to 75 weight percent, and most preferably from about 20-50 weight percent of the chewing gum.

The flavoring agents are those flavoring agents having at least 5 weight percent of a flavoring ingredient whose Solubility Parameter ranges between 14.0 and 18.0; and has at least a 0.5, preferably at least a 1.0 S.P.U. difference greater than, or less than, the average weighted Solubility Parameter of the gum base. These flavoring agents are contained in the chewing gums at between 0.01 to 10 weight percent of the chewing gum, preferably from 0.5 to 8.0 weight percent, and most preferably from 1.0-6.5 weight percent.

At least five weight percent, and preferably 10 weight percent or more, of the flavoring agent is a flavoring ingredient having a Solubility Parameter which is at least 0.5, preferably 1 0 S.P.U. greater than, or less than, the average weighted Solubility Parameter of the wax-free gum base used.

In addition, our chewing gums contain sweeteners, binders and bulking agents along with optional ingredients.

THE GUM BASES

The wax-free gum bases of our invention contain elastomers, which elastomers may be synthetic elastomers or natural elastomers or mixtures thereof. The synthetic elastomers are preferably selected from polyisobutylene, polyisoprene, isobutylene-isoprene copolymer, and butadiene-styrene copolymers. The natural rubbers can include, but are not limited to, chicle, jelutong, balata, guttapercha, lechicaspi, sorva, smoked or liquid latexes, quayle, perillo, nispevo, rosindinha, chiquibal, crown gum, dendare, niger gutta, tunu, chilte, or mixtures and blends thereof. Preferably, the elastomers are synthetic elastomers and/or natural elastomers by themselves or in various blends.

Most preferably, the elastomers are selected from synthetic elastomers such as styrene butadiene copolymers having a mole ratio of styrene to butadiene ranging from between about 3:1 to 1:3 and a weight average molecular weight ranging from about 10,000 to about 200,000. The elastomer can also be a polyisoprene having a weight average molecular weight ranging from about 10,000 to about 200,000. The elastomer may also be a polyisobutylene having a weight average molecular weight ranging from about 10,000 to about 200,000, or it can be an isobutylene-isoprene copolymer having a mole ratio of isobutylene to isoprene ranging from about 20:1 to about 1:20 and a weight average molecular weight ranging from about 10,000 to about 200,000. The synthetic elastomers listed above preferably have upper weight average molecular weights ranging from about 50,000 to about 150,000 and may be admixed one with the other or with any one or more of the natural elastomers in making the gum bases. Alternatively, different gum bases may be made from one or more of the synthetic or natural elastomers listed above, and gum bases blended to obtain the gum base used in our chewing gums.

Our wax-free gum bases also contain at least one elastomer solvent, sometimes referred to as elastomer plasticizers. The concentration of the elastomer solvent (plasticizer) may range from about 1.0 to about 50 weight percent, but preferably ranges from about 2.0 to about 40 weight percent of the total gum base composition.

These elastomer plasticizers may include, but are not limited to, natural rosin esters such as glycerol esters of partially hydrogenated rosins, the glycerol esters of polymerized rosin, the glycerol esters of partially hydrogenated rosins, the glycerol esters of rosin, the pentaerythritol esters of partially hydrogenated rosins, the methyl or partially hydrogenated metal esters of rosins, the pentaerythritol esters of rosins, and natural terpene resins, as well as synthetic plasticizers such as the synthetic terpene resins derived from alpha pinene, beta pinene, and/or d-limonene. Any suitable combination of these materials may also be used as the elastomer plasticizer.

The preferred elastomer plasticizer is dependent on the specific application and on the type of elastomer used. For example, the terpene resins used either entirely or in part to replace certain ester gums may cause most gum bases to become less tacky.

The gum bases also include fats, oils and other softeners including, but not limited to, tallow, hydrogenated tallow, hydrogenated and partially hydrogenated vegetable oils, cocoa butter, glycerol monostearate, glycerol triacetate, lecithin, mono-, di- and tri-glycerides, acetylated monoglycerides, fatty acids, including but not limited to stearic acid, palmetic acid, oleic acid, linoleic acid, lauric acid, myristic acid, arachidic acid, linolenic acid, caproic acid, caprylic acid, butyric acid, decenoic acid, gadoleic acid or mixtures thereof. Often simple methyl or ethyl esters, or pentaerythritol esters, of these fatty acids may also be used. Hydrogenated vegetable oils are generally preferred either alone or in combination with other fats and oils or softeners and are present in the formulation at least in part to compensate for the removal of petroleum waxes. Other synthetic softeners may be added during formulation of the gum base or during formulation of the chewing gum. These synthetic softeners can include but are not limited to glycerin, glycerol triacetate, acetylated monoglycerides, and the like.

Our wax-free gum bases also contain fillers and/or texturizers. These fillers or texturizers are present within the range of about 0.5 to about 40 weight percent, preferably from about 1.0 to about 30 weight percent and are selected from water insoluble organic or inorganic compounds such as, but not limited to, calcium carbonate, ground limestone, magnesium silicate, aluminum silicate, silicas, aluminas, talc, titanium dioxides, mono-, di-, or tricalcium phosphates, powdered or ground cellulosics, ground woods, clays and the like. These fillers or texturizers may also be used in combination one with the other as described above.

Our wax-free gum bases may also contain vinyl polymers which vinyl polymers are present within the range of about 0.5 to about 40 weight percent, preferably within the range of about 1 to about 35 weight percent and most preferably within the range of about 2 to about 30 weight percent. These vinyl polymers are primarily represented by polyvinyl acetate, partially hydrolyzed polyvinyl acetate, polyvinylalcohols, and copolymers of vinyl acetate and vinyl laurate, or any admixtures of these vinyl polymers. The polyvinyl acetates and partially hydrolyzed polyvinyl acetates normally have a weight average molecular weight ranging from about 2,000 to about 100,000 and the copolymers of vinyl acetate and vinyl laurate normally have an average molecular weight ranging from about 1,000 to about 100,000. When partially hydrolyzed polyvinyl acetates are used the degree of hydrolysis ranges from about 10% to about 90%, preferably between about 20% and about 80%.

When copolymers of vinyl acetate and vinyl laurate are used, they normally contain vinyl laurate at from about 5 to about 50 weight percent of the copolymer and they preferably have a weight average molecular weight ranging from about 10,000 to about 80,000. In addition to the vinyl polymers mentioned above, vinyl polymers can also include polyethylenes, polypropylenes, polybutylenes, copolymers of ethylene and vinyl acetate and the like, having weight average molecular weights ranging from about 10,000 to about 150,000 although these materials are normally sparingly used, and when used are preferably used in combination with other vinyl polymers above.

Our gums and gum bases contain colorants and whiteners which include FD&C type dyes and lakes, fruit and vegetable extracts, titanium dioxides, cocoa powder or combinations thereof.

When natural waxes are used in our gum bases, they are normally selected from the group consisting of candelilla wax, carnauba wax, ozoberite, oricury, beeswax, rice bran wax, Japan wax and jojoba wax, or mixtures thereof. Other natural waxes can also be used in combinations with the above or by themselves. The above listed waxes may also be used in combination one with the other, or in multiple combinations if required. Preferably, the waxes are formulated within the gum base at from 0.0 weight percent to about 3.5 weight percent of the gum base, using at least one natural wax from the group above.

The petroleum wax-free gum bases above most preferably contain from about 15 to about 75 weight percent elastomer or a combination of elastomers, from about 1.0 to about 40 weight percent of at least one elastomer plasticizer, from about 5 to about 35 weight percent fats, oils and softeners, from about 2 to about 30 weight percent fillers and texturizers, from about 2 to about 30 weight percent vinyl polymers, from about 0.5 to about 3.5 weight percent emulsifiers, whiteners, and antioxidants, and from about 0.0 to about 3.5 weight percent natural waxes. A particularly advantageous gum base does not contain natural waxes.

THE SWEETENERS

Our sweeteners may be high-calorie sweeteners or low-calorie sweeteners. They may be bulking sweeteners such as sugars, syrups, and sugar alcohols. The sweeteners are preferably selected from at least one of the group consisting of carbohydrate sugars such as dextrose, sucrose, levulose, maltose, dextrin, dried invert sugars, fructose, galactose, and corn syrup solids; sugar alcohols such as sorbitol, mannitol, xylitol, and maltitol; and high-intensity, low-calorie sweeteners such as sucralose, aspartame, acesulfame K and salts thereof, alitame, saccharin and salts thereof, cyclamic acid and salts thereof, glycyrrhizin, dihydrochalcones, thaumatin, monellin or mixtures thereof.

In the above lists, the high-calorie, so-called bulk sugars, include dextrose, sucrose, levulose, maltose, dextrins, dried invert sugars, fructose, galactose, and corn syrup solids, or any mixture thereof.

From the above list, the sugar alcohols can include sorbitol, mannitol, xylitol, and maltitol, or any mixture thereof. Other sugar alcohols or low sweetening agents are available.

Also, the above list includes the high-intensity, low-calorie, sweeteners including, but not limited to, sucralose, aspartame, acesulfame K and their salts, alitame, saccharin and its salts, cyclamic acid and its salts, glycyrrhizin, dihydrochalcones, thaumatin, and monellin, or mixtures thereof.

It is intended that sweeteners in our chewing gums can contain only the high-intensity, low-calorie, sweeteners and when the chewing gums contain only the high-intensity sweeteners, the concentration of sweetener ranges from about 0.01 to about 2.0 weight percent. Preferably with high-intensity, low-calorie sweeteners, the concentration of sweetener ranges from about 0.02 to about 1 percent of the chewing gum.

The high intensity sweeteners can be used in any admixture and when used with the sugar alcohol sweeteners such as xylitols, mannitols, sorbitols, and other sugar alcohols, or mixtures thereof, can lead to wax-free, high flavor release, low-calorie chewing gums.

Our petroleum wax free flavored chewing gums also preferably contain binders and bulking agents which can be selected from at least one of the group consisting of corn syrups, hydrogenated starch hydrolysates, sucrose syrups, invert sugar syrups, and oligosaccharides having an average degree of polymerization ranging between about 3 and about 50. These bulking agents are preferably used where binding capabilities can also be achieved by the use of the same bulking agents or mixtures thereof. These binding capabilities are primarily observed with corn syrups, hydrogenated starch hydrolysates and the oligosaccharides. In a most preferred embodiment, our binding agent-bulking agent components are selected from binders containing at least 35 weight percent oligosaccharides, which oligosaccharides may be selected from the group consisting of fructooligosaccharides, oligofructose, polydextrose, indigestible dextrins, isomaltulose oligosaccharides, and mixtures thereof.

To exemplify further the fast release or rapid flavor release, flavored gums of this invention, and the various Solubility Parameters useful in our invention, the following examples are presented. In the following tables, certain gum bases are formulated, wherein each of the organic ingredients of the gum bases have their Solubility Parameter calculated. Then, each of these gum bases have their weighted Solubility Parameter calculated. When inorganic materials such as fillers are in the formulation, since they are inorganic and are believed to have no essential effect on Solubility Parameter, they are subtracted from the calculation.

Table 3 presents a series of ingredients used to formulate the gum bases of the invention, and comparative wax-containing gum bases. These listed ingredients are illustrative, but not limiting, of ingredients useful in our invention.

TABLE 3

Gum Base Ingredients

| Ingredient | Ingredient Solubility Parameter |
|---|---|
| Waxes | |
| Microcrystalline Wax, 180° F. M.P. | 17.5 |
| Microcrystalline Wax, 170° F. M.P. | 17.3 |
| Paraffin Wax | 17.5 |
| White paraffin wax, 145° F., M.P. | 17.3 |
| White paraffin wax, 135° F., M.P. | 17.1 |
| Paraffin Wax (M.P. = 400° F.) | (17.3) |
| Synthetic Elastomers | |
| 98.5% isobutylene-1.5% isoprene (ave M.W. 120–150,000) | 16.0 |
| Polyisobutylene (50–80,000 ave M.W.) | 16.0 |
| 7.5 mole percent butadiene-25 mole % Styrene (ave M.W. = 80–100,000) | 17.0 |
| 50:50 mole % styrene: Butadiene Copolymer | (17.0) |
| Natural Elastomers | |
| Jelutong | 17.0 |
| Massarandula balata | 17.0 |
| Sorva | 17.0 |
| Plasticizer | |
| Glycerol ester of polymerized rosin | (18.2) |
| Glycerol ester of hydrogenated rosin | 18.2 |
| Glycerol monostearate | 19.0 |
| Triacetin | 19.3 |
| Glycerol ester of wood rosin | 18.5 |
| Fats, Oils | |
| Hydrogenated cottonseed oil | 18.3 |
| Hydrogenated soybean oil | 18.8 |
| Partially hydrogenated vegetable oil | (21.0) |
| Vinyl Polymer | |
| Polyvinyl acetate (25,000 ave M.W.) | 19.1 |
| Polyvinyl acetate (ave M.W. = 50–80,000) | 18.9 |

Other Gum Base Ingredients with essentially minimal effect on weighted average Solubility Parameters:

| Ingredient | Solubility Parameters |
|---|---|
| FIllers and Pigments | — |
| Talc | — |
| CaCO₃ | — |
| TiO₂ | — |
| Colorants | — |
| Yellow colorant | — |
| Blue colorant | — |
| Antioxidants* | |
| BHT, butylated hydroxytoluene | — |

-continued

| Ingredient | Solubility Parameters |
|---|---|
| BHA, butylated hydroxyanisole | — |

*Although Solubility Parameters could be calculated for antioxidants, their use levels are relatively low and their effect other than for their intended purpose, is believed negligible for flavor release.

Tables 4-11 provide Gum Bases, illustrating the calculation of average weighted Solubility Parameter, and the parameters needed to calculate it.

TABLE 4
Gum Base #1

| | Ingredients | Wt. % | $\Delta\delta$* |
|---|---|---|---|
| 1. | Microcrystalline waxes | #1 - 10.25 | 1.961 |
| 2. | Mixture of Synthetic Elastomers | #1 - 5.33 | 0.932 |
| | | #2 - 2.79 | 0.488 |
| 3. | Mixture of Natural Elastomers | #1 - 21.71 | 4.034 |
| | | #2 - 0.93 | 0.173 |
| | | #3 - 7.46 | 1.386 |
| 4. | Elastomer Plasticizer | #1 - 2.00 | 0.398 |
| | | #2 - 9.45 | 1.880 |
| 5. | Fats and Oils | #1 - 2.93 | 0.586 |
| | | #2 - 2.00 | 0.411 |
| 6. | Vinyl polymers | #1 - 26.63 | 5.560 |
| 7. | Filler ($CaCO_3$) | #1 - 8.52 | — |

$\Sigma\Delta\delta_{Base} = 17.81$**

*$\Delta\delta = \dfrac{(Wt.\ \%)_i (\delta)_i}{Base\ \%}$;

where Base % = 100 − Filler % − absent ingredient %
For Base #1; % Base = 91.48 and $\Sigma\Delta\delta_{Base}$ = 17.81
**$\Sigma\Delta\delta_{Base}$ is the average weighted Solubility Parameter for the gum base.

TABLE 5
Gum Base #2

Same Gum base as #1, except no vinyl polymer
$\Delta\delta = (Wt.\ \%)_i (\delta)_i/Base\ \%$, where Base % = 64.85%
$\Sigma\Delta\delta = 17.28$ (average weighted Solubility Parameter, Base #2)

TABLE 6
Gum Base #3

Same as Base #1, except no Synthetic Elastomer #1 copolymer and no $CaCO_3$ filler
Base % = 83.36%
$\Delta\delta_i = (Wt.\ \%)_i (\delta)_i/Base\ \%$
$\Sigma\Delta\delta = 17.99$ (average weighted Solubility Parameter for Base #3)

TABLE 7
Gum Base #4

| Ingredient | Wt. % | $\Delta\delta$ |
|---|---|---|
| Synthetic elastomers | #1 - 9.971 | 1.839 |
| | #2 - 15.954 | 2.943 |
| Vinyl polymer | #1 - 21.737 | 4.786 |
| Fats & Oils | #1 - 13.295 | 2.805 |
| | #2 - 13.295 | 2.881 |
| | #3 - 9.938 | 2.382 |
| Elastomer Plasticizer | #1 - 2.659 | 0.582 |
| Inert Fillers, Colorants, Anti-Oxidant Total = 13.25 | | — |

Base % = 86.75%
$\Sigma\Delta\delta = 18.22$ (average weighted Solubility Parameter for Base #4)

TABLE 8
Gum Base #5

| Ingredient | Wt. % | $\Delta\delta$ |
|---|---|---|
| Synthetic Elastomers | #1 - 8.0 | 1.707 |
| | #2 - 0.96 | 0.205 |
| Waxes | #1 - 17.0 | 3.921 |
| | #2 - 8.5 | 1.983 |
| Vinyl polymer | #1 - 6.56 | 1.671 |
| Elastomer Plasticizer | #1 - 4.96 | 1.257 |

TABLE 8-continued
Gum Base #5

| Ingredient | Wt. % | $\Delta\delta$ |
|---|---|---|
| | #2 - 29.02 | 7.042 |
| Filler | #1 - 25.0 | $\Sigma\Delta\delta$ = 17.79 |

Base % = 75.0%
$\Sigma\Delta\delta = 17.79$ (average weighted Solubility Parameter = 17.79 for Gum Base #5)

TABLE 9
Gum Base #6

| Ingredient | Wt. % | $\Delta\delta$ |
|---|---|---|
| Synthetic Elastomers | #1 - 3.34 | 0.66 |
| | #2 - 3.74 | 0.785 |
| | #3 - 9.21 | 1.819 |
| Waxes | #1 - 2.54 | 0.542 |
| | #2 - 4.14 | 0.874 |
| Fats & Oils | #1 - 13.34 | 3.014 |
| | #2 - 4.40 | 1.021 |
| Elastomer Plasticizer | #1 - 4.00 | 0.938 |
| | #2 - 4.13 | 0.928 |
| | #3 - 1.47 | 0.350 |
| | #4 - 7.61 | 1.738 |
| Vinyl polymers | #1 - 9.87 | 2.303 |
| | #2 - 13.21 | 3.115 |
| Inerts/Filler | 19.0% | — |

Base % = 81.0%
$\Sigma\Delta\delta = 18.09$ (average weighted Solubility Parameter for Gum Base #6)

TABLE 10
Gum Base #7

| Ingredient | Wt. % | $\Delta\delta$ |
|---|---|---|
| Synthetic Elastomers | #1 - 6.97 | 1.488 |
| Waxes | #1 - 13.02 | 2.937 |
| Vinyl polymers | #1 - 31.30 | 7.895 |
| Plasticizer | #1 - 5.94 | 1.506 |
| | #2 - 13.02 | 3.162 |
| | #3 - 4.68 | 1.205 |
| Inerts/Fillers | 25.07% | — |

% Base = 74.93%  $\Sigma\Delta\delta$ = 18.19
$\Sigma\Delta\delta = 18.19$ (average weighted Solubility Parameter for Gum base #7)

TABLE 11
Gum Base #8

| Ingredient | Wt. % | $\Delta\delta$ |
|---|---|---|
| Synthetic Elastomers | #1 - 6.00 | 1.211 |
| | #2 - 1.07 | 0.229 |
| | #3 - 1.07 | 0.229 |
| | #4 - 8.53 | 1.721 |
| Waxes | #1 - 2.93 | 0.647 |
| | #2 - 0.93 | 0.201 |
| | #3 - 4.93 | 1.075 |
| | #4 - 1.20 | 0.262 |
| Plasticizers | #1 - 1.20 | 0.275 |
| | #2 - 4.00 | 0.958 |
| | #3 - 7.73 | 1.774 |
| | #4 - 0.67 | 0.163 |
| | #5 - 10.13 | 2.363 |
| Vinyl polymers | #1 - 4.66 | 1.111 |
| | #2 - 10.66 | 2.568 |
| Fats & Oils | #1 - 4.53 | 1.074 |
| | #2 - 6.13 | 1.415 |
| | #3 - 2.93 | 0.776 |
| Inerts/Fillers | 20.7% | — |
| | | $\Sigma\Delta\delta$ = 18.05 |

% Base = 79.3%
$\Sigma\Delta\delta = 18.05$ (average weighted Solubility Parameter for Gum Base #8)

The rate of flavor release presented for the flavoring ingredients i.e., $-R_f X\ 10^3$, is calculated using standard regression analysis techniques, from the formula:

$$\ln((-F_f) = a + bx + cy + dz$$

where
—$R_f$= rate of flavor release
a,b,c,d = constants, and
x = Σδ for elastomers/polymers
Y = Σδ for waves
z = Σδ for other ingredients To use this model, the Solubility Parameter of the eight gum bases from the table 4-11 above were fitted by standard regression analysis into the formula for rate of flavor release. The constants are calculated ad ln $(-R_f)$, and subsequently $-R_f$ are then calculated for each flavor ingredient in each gum base. The constants obtained by regression analysis for the above formulas, when testing was completed for the formulations containing 1-methal are as follows:

| a = −23.39 | c = 1.37 |
|---|---|
| b = 1.37 | d = 1.37 |

Therefore, the expected rate of release for Gum Base #1 and the flavoring ingredient, 1-menthol, would be calculated as follows:

| 1-menthol | $r^2$ | a | b | c | d |
|---|---|---|---|---|---|
|  | 0.91 | −23.39 | 1.37 | 1.37 | 1.37 | and $\ln(-R_f) =$ −23.39 + 1.37 X + 1.37 Y + 1.37 Z

| X | = | Σδ$_{polymer}$ | = | 12.574 |
|---|---|---|---|---|
| Y | = | Σδ$_{wax}$ | = | 1.961 |
| Z | = | Σδ$_{others}$ | = | 3.275 |
|  |  |  |  | 17.81 |

$r^2$ is a correlation coefficient of regression analysis and $-R_f$ therefore equals 2.75, a relatively fast flavor release.

However, when compared to the Gum Base #1 absent wax, the following calculations demonstrate the following:

| Base #1 (no wax) ΣΔδ = 17.85; Base % = 81.23 |  |  |
|---|---|---|
| X = | Σδ$_{polymer}$ = | 14.17 |
| Y = | Σδ$_{wax}$ = | 0 |
| Z = | Σδ$_{others}$ = | 3.68 |
|  |  | 17.85 |

When each flavoring ingredient is compared to itself in the wax-containing and wax-free Gum Base #1, the results demonstrate certain enhanced flavor releases.

TABLE 12

| Flavoring Ingredient | $-R_f$ for Gum Base #1 | $-R_f$ for Wax-Free Base #1 |
|---|---|---|
| α-Pinene | — | 1.213 |
| β-Pinene | — | 3.030 |
| α-Terpinol | — | 3.873 |
| p-Cymene | — | 4.264 |
| 1,8-Cineol/d-limonene | — | 4.951 |
| δ-Terpinene | — | 3.319 |
| 1-Menthone | — | 2.505 |
| Isomenthone | — | 3.379 |
| Neomenthol | — | 2.899 |
| 1-Menthol | 2.75 | 2.899 |
| Pulegone | — | 4.751 |

TABLE 12-continued

| Flavoring Ingredient | $-R_f$ for Gum Base #1 | $-R_f$ for Wax-Free Base #1 |
|---|---|---|
| Piperitone | — | 6.270 |

Using the same approach, a gum base having no wax may be formulated.

TABLE 14

| Ingredients | Wt. % | δ | Δ | δ |
|---|---|---|---|---|
| Synthetic Elastomers | #1 - 10.0% | 16.0 | 2.05 | 1.600/.78 |
|  | #2 - 5.0% | 16.0 | 1.03 | 0.800/.78 |
|  | #3 - 5.0% | (17.0) | 1.09 | 0.850/.78 |
| Natural Elastomers | #1 - 2.5% | 17.0 | 0.54 | 0.425/.78 |
|  | #2 - 2.5% | 17.0 | 0.54 | 0.425/.78 |
| Vinyl polymers | #1 - 5.0 | 19.1 | 1.22 | 0.955/.78 |
|  | #2 - 10.0 | 18.9 | 2.42 | 1.890/.78 |
| Fats & Oils | #1 - 5.0 | 18.3 | 1.17 | 0.915/.78 |
|  | #2 - 5.0 | 18.8 | 1.21 | 0.940/.78 |
|  | #3 - 5.0 | (21.0) | 1.35 | 1.050/.78 |
| Plasticizers | #1 - 2.5 | (18.2) | 0.58 | 0.455/.78 |
|  | #2 - 7.5 | (18.2) | 1.75 | 1.365/.78 |
|  | #3 - 5.0 | 18.5 | 1.19 | 0.925/.78 |
|  | #4 - 3.0 | 19.3 | 0.74 | 0.579/.78 |
| Natural Elastomers | #1 - 5.0 | 17.0 | 1.09 | 0.850/.78 |
| Fillers, Inerts, Antioxidants | 22% | — | — |  |

ΣΔδ = 17.98

% Base = 78.0
Average weighted Solubility Parameter = 17.98
petroleum wax-free gum base Similar enhanced flavor release would be expected when the Solubility Parameter for at least 5%, preferably at least 10% of the flavoring agent is 0.5, preferably at least 1.0 S.P.U. greater than, and preferably less than, the average weighted Solubility Parameter for the

SUMMARY FOR THE ABOVE TABLES 3-14

Table 3 above provides a list of typical chewing gum ingredients, grouped in class, such as elastomers, waxes, plasticizers, vinyl polymers, and the like. These individual ingredients have their Solubility Parameters calculated and presented in this table.

Tables 4-11 provide examples of gum bases which have been used for comparative wax containing gum bases. The gum bases of this invention are wax-free and have flavor ingredients formulated with the gum bases having the characteristics of Solubility Parameter at least 0.5 S.P.U.s greater than, or less than, the average weighted Solubility Parameter of the wax-free gum base.

Earlier some 15 different flavor ingredients are listed, with the Solubility Parameters for the listed flavor ingredients. The gum bases of tables 414 11 are also presented and calculations are given for rate of flavor release which indicate that flavor release depends on the difference between the Solubility Parameter for the flavor ingredient and the weight averaged Solubility Parameter for the gum base, indicating, in most cases, the preferred use of Solubility Parameters in determining enhanced release of flavoring agents, particularly certain breath freshening flavoring ingredients, in the presence of the wax-free gum bases.

Tables 13 and 14 present some preferred embodiments for the petroleum wax-free gum bases in combination with certain flavoring agents which provide rapid flavor release, and enhanced breath freshening perception.

MANUFACTURE AND PROCESSING

The wax-free gum base of the invention constitutes about 10-90 weight percent of the chewing gum, more typically about 10-75 weight percent of the chewing gum, and most commonly about 20-50 weight percent of the chewing gum. The gum base is typically prepared by adding an amount of the elastomer, elastomer plasticizers, vinyl polymer and filler to a heated sigma blade mixer with a front to rear blade speed ratio of typically 2:1. The temperature is normally sufficiently high to melt the final gum base. The initial amounts of ingredients are determined by the working capacity of the mixing kettle in order to attain a proper consistency. After the initial ingredients have massed homogeneously, the balance of the elastomer, or even another elastomer, and the selected plasticizer, filler, softeners, etc. are added in a sequential manner until a completely homogeneous molten mass is attained. This can usually be achieved in from about 30 minutes to about four hours, depending on the formulation. The final mass temperature can be between about 60° C. and about 150° C., more preferably between about 80° C. and about 120° C. The completed molten mass is emptied from the mixing kettle into coated or lined pans, extruded or cast into any desirable shape and allowed to cool and solidify.

Although the above method for making base is typical and applies to both chewing and bubble bases, it has been found that there is a preferred method for making the bubble gum bases of this invention.

First, a majority of elastomer and vinyl polymer and filler are added and blended in a heated sigma blade mixer. Softeners, including fats and oils, and/or emulsifiers may then be added along with a second portion of each of the selected elastomer or elastomers and filler.

Next, the remainder, if any, of the elastomers and filler are added along with the elastomer plasticizer. Finally, the remaining ingredients, such as glycerol monostearate and antioxidants may be added. Colorant may be added at any time during the mixing process and is preferably added at the start. Natural wax, if present, may also be added at any time, but is preferably added after the first elastomer addition.

There are some variations to the above described preferred method which in no way limit the method as described. Those skilled in the art of gum base manufacture may be able to appreciate any minor variations.

In producing petroleum wax-free gum bases high in vinyl polymer, particularly, polyvinyl acetate, and particularly those high in high molecular weight polyvinyl acetate, it is not necessary to improve blending of the ingredients by removing the heat applied to the sigma blade mixer at some point in the process, as is often required with wax containing gum bases. In the inventive petroleum wax-free gum base process for making the inventive gum base free of petroleum wax, there is reduced need to remove the heat applied, since incompatibility of the vinyl polymer is greatly reduced since there is no petroleum wax present.

In addition to the water-insoluble gum base, a typical chewing gum composition includes a water soluble bulk portion including sweeteners, including high potency, i.e. high-intensity sweeteners and bulking sweeteners, and one or more flavoring agents. The wax-free gum base of the invention can be used with any typical chewing gum composition, including bubble gums or specialty gums.

The water soluble portion of the chewing gum may also include synthetic softeners, bulk sweeteners such as sugars and sugar alcohols, high-intensity sweeteners, the flavoring agents of this invention and combinations thereof. However, the Solubility Parameter of at least 5 weight percent of the flavoring agent should be at least 0.50 S.P.U.s greater than, or less than, the average weighted Solubility Parameters of the gum base, and the gum base should have an average weighted Solubility Parameter of between about 16.0 and 21.0.

Softeners are added to the chewing gum in order to optimize the chewability and mouth feel of the gum. The softeners may include glycerin, lecithin, and combinations thereof. Aqueous sweetener solutions such as those containing sorbitol, hydrogenated starch hydrolysates, corn syrup and combinations thereof, may also be used as binding agents either alone or in combination with oligosaccharide binding agents.

Chewing gum is generally manufactured by sequentially adding the various chewing gum ingredients to any commercially available mixer known in the art. After the ingredients have been thoroughly mixed, the gum mass is discharged from the mixer and shaped into the desired form, such as by rolling into sheets and cutting into sticks, extruding into chunks, or casting into pellets. Generally, the ingredients are mixed by first melting the gum base and adding it to the running mixer. The gum base may alternatively be melted in the mixer. Color and emulsifiers can be added at this time.

A softener such as glycerin can be added next along with any needed binders. The binder components may be added separately, or pre blended and added together. Further parts of the bulk portion, including sweeteners, may then be added to the mixer. The flavoring agents are typically added with the final part of the bulk portion. The flavor agents are selected so as to have flavoring ingredients with Solubility Parameters as described. The entire mixing process typically takes from five to fifteen minutes, although longer mixing times are sometimes required. Those skilled in the art will recognize that variations of this mixing procedure, or other mixing procedures, including continuous processes may be followed.

TASTE TESTING

By way of example, and not limitation, taste results of gum created from commercial gum bases that have wax vis-a-vis chewing gum, created from gum bases that do not include petroleum waxes pursuant to the present invention are presented below.

The testing was performed using a blind study protocol. One hundred fifty participants were used in each of the three studies. Fifty percent of the participants in each study had chewed the commercial (control) product as their regular preferred gum before the study and 50% of the participants had chewed the control gum at least once during the preceding week before the study.

During the study, each participant was given one of the two gum products to chew for 12 minutes. This was followed by a cleansing period of 6 minutes. The second product was then chewed for 12 minutes. During the study, half of the participants were given the control first and half the new product. The participants were asked for their preferences based on a number of criteria.

The results were as follows:

EXAMPLE NO. 1A

In this example, the control chewing gum comprised: 25.2% of a gum base with wax; 48.45% sorbitol; 16.80% glycerine; 8.01 mannitol; 1.33% flavor; and 0.21% encapsulated aspartame.

The petroleum wax-free chewing gum comprised: 25.2% of the gum base of the control modified pursuant to the present invention; 48.45% sorbitol; 16.80% glycerine; 8.01% mannitol; 1.33% flavor; and 0.21% encapsulated aspartame.

For this test, the flavoring agent was a spearmint oil flavor:

| PREFERENCES | Prefer No Wax % | Prefer Wax % |
|---|---|---|
| Overall Preference | 52 | 47 |
| Tastes Best | 52 | 46 |
| More Refreshing | 50 | 46 |
| Chewing Texture | 50 | 47 |
| Refreshing Breath | 55 | 40 |
| Long Lasting Taste | 52 | 41 |
| Better Spearmint Flavor | 49 | 48 |
| Better Appearance | 36 | 44 |
| Sweeter | 54 | 40 |
| Less Bitter | 44 | 45 |
| Softer | 79 | 16 |
| Better Smell | 38 | 51 |
| Stronger Flavor | 57 | 42 |
| Stuck More To Teeth | 31 | 31 |
| Rather Buy | 52 | 44 |

FLAVOR OVERALL (1 MINUTE)

| | No Wax | Wax |
|---|---|---|
| "Excellent" | 23% | 21% |

STRENGTH OF FLAVOR (1 MINUTE)

| | No Wax | Wax |
|---|---|---|
| "About Right" | 70% | 70% |

FLAVOR OVERALL (12 MINUTES)

| | No Wax | Wax |
|---|---|---|
| "Excellent" | 9% | 7% |

STRENGTH OF FLAVOR (12 MINUTES)

| | No Wax | Wax |
|---|---|---|
| "About Right" | 51% | 56% |

EXAMPLE NO. 2A

In this example, the control chewing gum comprised: 25.16% base with wax; 48.38% sorbitol; 8.00% mannitol; 16.66% glycerine; 1.55% flavor; and 0.25% encapsulated aspartame.

The no wax chewing gum comprised: 25.16% of the base of the control modified pursuant to the present invention; 48.28% sorbitol; 8.00% mannitol; 16.66% glycerine; 1.65% flavor; and 0.25% encapsulated aspartame. The flavoring agent was a Spearmint oil.

| PREFERENCES | Prefer No Wax % | Prefer Wax % |
|---|---|---|
| Overall Preference | 49 | 47 |
| Tastes Best | 47 | 50 |
| More Refreshing | 49 | 46 |
| Chewing Texture | 46 | 51 |
| Refreshing Breath | 46 | 48 |
| Long Lasting Taste | 47 | 49 |
| Better Spearmint Flavor | 50 | 46 |
| Better Appearance | 39 | 39 |
| Sweeter | 44 | 47 |
| Less Bitter | 37 | 47 |
| Softer | 72 | 24 |
| Better Smell | 50 | 43 |
| Stronger Flavor | 53 | 44 |
| Stuck More To Teeth | 13 | 37 |
| Rather Buy | 48 | 48 |

FLAVOR OVERALL (1 MINUTE)

| | No Wax | Wax |
|---|---|---|
| "Excellent" | 22% | 17% |

STRENGTH OF FLAVOR (1 MINUTE)

| | No Wax | Wax |
|---|---|---|
| "About Right" | 64% | 65% |

FLAVOR OVERALL (12 MINUTES)

| | No Wax | Wax |
|---|---|---|
| "Excellent" | 11% | 7% |

STRENGTH OF FLAVOR (12 MINUTES)

| | No Wax | Wax |
|---|---|---|
| "About Right" | 48% | 47% |

EXAMPLE NO. 3A

In this example, the control comprised: 20.6% base with wax; 57.63% sugar; 20.39% corn syrup; 0.83% glycerine; and 0.55% flavor. The now wax chewing gum comprised: 20.6% of the base of the control modified pursuant to the invention; 59.49% sugar; 18.5% corn syrup; 0.83% glycerine; and 0.58% flavor. The flavoring agent was a Spearmint.

| PREFERENCES | Prefer No Wax % | Prefer Wax % |
|---|---|---|
| Overall Preference | 56 | 43 |
| Tastes Best | 53 | 44 |
| More Refreshing | 51 | 48 |
| Chewing Texture | 48 | 48 |
| Refreshing Breath | 51 | 45 |
| Long Lasting Taste | 50 | 46 |
| Better Spearmint Flavor | 46 | 51 |
| Better Appearance | 45 | 38 |
| Sweeter | 40 | 55 |
| Less Bitter | 46 | 43 |
| Softer | 43 | 52 |
| Better Smell | 46 | 45 |
| Stronger Flavor | 46 | 52 |
| Stuck More To Teeth | 26 | 32 |
| Rather Buy | 51 | 45 |

FLAVOR OVERALL (1 MINUTE)

| | No Wax | Wax |
|---|---|---|
| "Excellent" | 21% | 21% |

STRENGTH OF FLAVOR (1 MINUTE)

| | No Wax | Wax |
|---|---|---|
| "About Right" | 71% | 68% |

FLAVOR OVERALL (12 MINUTES)

| | No Wax | Wax |
|---|---|---|
| "Excellent" | 7% | 6% |

STRENGTH OF FLAVOR (12 MINUTES)

| | No Wax | Wax |
|---|---|---|
| "About Right" | 45% | 38% |

Additional formulas were used to manufacture breath freshening chewing gums, using peppermint, with and without wax. The formulas are below:

| Peppermint Gum | | |
|---|---|---|
| Sugar Peppermint Gum | | |
| Sugar | 61.93 | 61.93 |
| Wax-Containing Gum Base | 20.10 | — |
| Wax-Free Gum Base | — | 20.10 |
| Corn Syrup | 16.04 | 16.04 |

-continued

| Peppermint Gum | | |
|---|---|---|
| Glycerin | 1.07 | 1.07 |
| Peppermint Flavor | 0.86 | 0.86 |
| Sugarless Peppermint Stick Gum | | |
| Sorbitol | 48.3776 | 48.2776 |
| Wax-Containing Base | 25.1569 | — |
| Wax-Free Base | — | 25.1569 |
| Hydrogenated Starch Hydrolysate/Glycerin Blend | 9.2450 | 9.2450 |
| Mannitol | 7.9984 | 7.9984 |
| Glycerin | 7.4191 | 7.4179 |
| Peppermint Flavor | 1.4191 | 1.5191 |
| Encapsulated Aspartame | 0.2561 | 0.2561 |
| Lecithin | 1.290 | 0.0787 |

These test gums were chewed by a taste panel of about 145 persons. The results are presented below. The "New Version" is petroleum wax-free.

| Preferences Between Gums - New Version vs. Current Product Sugar Containing | | |
|---|---|---|
| Base: Total Sample | Total 145 % | Main Brand 40 % |
| Overall Preference | | |
| Prefer New Version | 51 | 65 |
| Prefer Current Product | 46 | 35 |
| Tasted Better | | |
| New Version | 54 | −70 |
| Current Product | 43 | −28 |
| Better Mint Flavor | | |
| New Version | 46 | 58 |
| Current Product | 50 | 43 |
| Refreshment | | |
| Prefer New Version | 50 | −65 |
| Prefer Current Product | 47 | −33 |
| Overall Texture | | |
| Prefer New Version | 50 | 53 |
| Prefer Current Product | 41 | 40 |
| Softer Gum | | |
| New Version | −19 | −18 |
| Current Product | −74 | −80 |
| Refreshing Mouth | | |
| Prefer New Version | 52 | 63 |
| Prefer Current Product | 43 | 33 |
| Refreshing Breath | | |
| Prefer New Version | 47 | 58 |
| Prefer Current Product | 48 | 38 |
| Cooled the mouth more | | |
| New Version | 50 | −65 |
| Current Product | 45 | −30 |
| Longer Lasting Taste | | |
| Prefer New Version | 52 | 58 |
| Prefer Current Product | 42 | 38 |
| More Bitter Gum | | |
| New Version | 37 | 35 |
| Current Product | 47 | 50 |
| Sweeter Gum | | |
| New Version | 43 | 48 |
| Current Product | 50 | 48 |
| More likely to stick to teeth | | |
| New Version | −24 | −20 |
| Current Product | −50 | −58 |
| Strong Flavor | | |
| New Version | 50 | 63 |
| Current Product | 47 | 38 |
| Better Appearance | | |
| Prefer New Version | −26 | 33 |
| Prefer Current Product | −47 | 43 |
| Better Color | | |
| Prefer New Version | −28 | 33 |
| Prefer Current Product | −47 | 48 |

| Preferences Between Gums - New Version vs. Current Product Sugar Containing | | |
|---|---|---|
| Base: Total Sample | Total 145 % | Main Brand 40 % |
| Which One Would Rather Buy | | |
| Prefer New Version | 52 | −68 |
| Prefer Current Product | 43 | −30 |
| Better Aroma | | |
| Prefer New Version | 49 | 63 |
| Prefer Current Product | 41 | 33 |

The current version was agreed as rather the softer product, although with a slightly more attractive color and appearance. It was, however, slightly more likely to stick to the teeth, perhaps due to its very soft nature. Directionally, most of the overall and flavor preferences favored the new product, but the only areas of significance were among main brand chewers for whom the new product generally tasted better, was more refreshing, cooling and was the one preferred for purchasing. Main brand users were also rather more in favor of the new version's performance in terms of longer lasting, stronger flavor and smell although these latter preferences were not quite significant at the 95% level.

| Preferences Between Gums Sugarless Gum | | |
|---|---|---|
| Base: Total Sample | Total Sample 175 % | Main Brand (61) % |
| Overall Preference | | |
| Prefer (New) | 50 | 52 |
| Prefer (Existing) | 48 | 46 |
| Better Taste | | |
| Prefer (New) | 46 | 49 |
| Prefer (Existing) | 50 | 46 |
| Better Peppermint Flavor | | |
| Prefer (New) | 49 | 46 |
| Prefer (Existing) | 46 | 49 |
| Refreshment | | |
| Prefer (New) | 49 | 54 |
| Prefer (Existing) | 46 | 43 |
| Overall Texture | | |
| Prefer (New) | 45 | 48 |
| Prefer (Existing) | 50 | 48 |
| Refreshing Breath | | |
| Prefer (New) | 46 | 48 |
| Prefer (Existing) | 47 | 46 |
| Longer Lasting Taste | | |
| Prefer (New) | 47 | 48 |
| Prefer (Existing) | 40 | 49 |
| Better Appearance | | |
| Prefer (New) | 37 | 34 |
| Prefer (Existing) | 37 | 36 |
| Sweeter Gum | | |
| (New) | 45 | 41 |
| (Existing) | 45 | 49 |
| Less Bitter Gum | | |
| (New) | 35 | 36 |
| (Existing) | 47 | 46 |
| Softer Gum | | |
| (New) | 72 | 70 |
| (Existing) | 22 | 21 |
| Better Smell | | |
| Prefer (New) | 49 | +52 |
| Prefer (Existing) | 40 | 31 |
| Stronger Flavor | | |
| (New) | 54 | 54 |

-continued

| Preferences Between Gums Sugarless Gum | | |
|---|---|---|
| Base: Total Sample | Total Sample 175 % | Main Brand (61) % |
| (Existing) Stick to Teeth More | 43 | 41 |
| (New) | 23 | 21 |
| (Existing) Which One Would Rather Buy | 23 | 23 |
| Prefer (New) | 47 | 52 |
| Prefer (Existing) | 48 | 48 |

+ Just under significance at the 95% level

While the embodiments of the invention disclosed herein are presently considered to be preferred, various modifications and improvements can be made without departing from the spirit and scope of the invention. The scope of the invention is indicated in the appended claims, and all changes that come within the meaning and range of equivalency of the claims are intended to be embraced therein.

Having described our invention we claim:

1. A petroleum wax-free chewing gum comprising:
    a) a petroleum wax-free gum base containing at least 1.0 weight percent of at least one elastomer plasticizer; and
    b) at least 0.01 weight percent of a flavoring agent; wherein the petroleum wax-free gum base has an average weighted Solubility Parameter ranging from about 16.0 to about 21.0 S.P.U.s, and wherein at least 5 weight percent of the flavoring agent has a Solubility Parameter of from about 0.5 S.P.U.s greater than, or less than, the average weighted Solubility Parameter of the gum base.

2. The chewing gum of claim 1 further comprising from about 0.001 weight percent sweeteners to about 70.0 weight percent sweeteners, and from about 5 to about 75 weight percent binders/bulking agents.

3. The chewing gum of claim 2 wherein the petroleum wax-free gum base comprises:

| Ingredients | Weight Percent |
|---|---|
| elastomers | about 10-90% |
| elastomer plasticizer | about 1-90% |
| fillers | about 1-40% |
| vinyl polymers | about 1-40% |
| fats, oils, softeners | about 1-40% |
| emulsifiers, colorants, whiteners, antioxidants | about 0.1-5% |
| natural waxes | about 0.0-5% |

4. The chewing gum of claim 3 further comprising at least one elastomer selected from synthetic elastomers, natural elastomers, or mixtures thereof; and further wherein the gum base has an average weighted Solubility Parameter ranging from about 17.0 to about 20.0.

5. The chewing gum of claim 3 wherein the sweeteners are selected from high-intensity sweetener, low-intensity sweeteners, or mixtures thereof.

6. The chewing gum of claim 5 wherein the sweetener is at least one high-intensity sweetener selected from the group consisting of:
    a) sucralose
    b) aspartame
    c) acesulfame K and/or salts thereof
    d) alitame
    e) saccharin and/or salts thereof
    f) cyclamic acid, and/or salts thereof
    g) glycyrrhizin
    h) dihydrochalcones
    i) thaumatin, and
    j) monellin 7. The chewing gum of claim 1 wherein the flavoring agent has a Solubility Parameter of at least 1.0 S.P.U.s greater than, or less than the average weighted Solubility Parameter of the petroleum wax-free gum base, and further, wherein the average weighted Solubility Parameter of the gum base is about 17.0 to about 20.0; and further wherein the chewing gum comprises from 0.001-70 weight percent, based on total chewing gum weight, of at least one sweetener and from about 5 to about 75 weight percent of at least one binder/bulking agents.

8. The chewing gum of claim 7 comprising:

| Ingredients | Average Weighted δ, Solubility Parameter | Weight Percent |
|---|---|---|
| Wax-free gum base | 17.0-20.0 | about 15-75 |
| Sweeteners | — | about 0.001-50 |
| Flavoring agents | 14.0-18.0 | about 0.01-10.0 |
| Binders/bulking agents | — | about 10-65 | wherein at least 5 weight percent of the flavoring agent is a flavoring ingredient having a Solubility Parameter which is 0.5 Solubility Parameter Units greater than, or less than, the average weighted Solubility Parameter of the wax-free gum base; and further wherein the binder/bulkling agents are selected from at least one of the group consisting of:
    a) corn syrup,
    b) hydrogenated starch hydrolysates,
    c) sucrose syrups,
    d) invert sugar syrups, and
    e) oligosaccharides having an average degree of polymerization ranging between about 3 and 50; and further
wherein the sweeteners are selected from at least one of the group consisting of:
    a) dextrose
    b) sucrose
    c) levulose
    d) maltose
    e) dextrin
    f) dried invert sugars
    g) fructose
    h) galactose
    i) corn syrup solids
    j) sorbitol
    k) mannitol
    l) xylitol
    m) maltitol
    n) sucralose
    o) aspartame
    p) acesulfame K and salts thereof
    q) slitame
    r) saccharin and salts thereof
    s) cyclamic acid and salts thereof
    t) glycyrrhizin
    u) dihydrochalcones
    v) thaumatin, and w) monellin.

9. The chewing gum of claim 1 wherein the flavoring agent comprises at least 5 weight percent of at least one of the flavoring ingredients selected from the group:

| Flavoring Ingredient | δ, Solubility Parameter |
|---|---|
| a) α-pinene | about 14.69 |
| b) β-pinene | about 14.65 |
| c) α-terpineol | about 17.63 |
| d) p-cymene | about 16.44 |
| e) 1,8-cineol/d-limonene | about 14.94/15.27 |
| f) δ-terpinene | about 15.61 |
| g) l-menthone | about 16.43 |
| h) isomenthone | about 16.43 |
| i) menthofuran | about — |
| j) neomenthol | about 17.74 |
| k) l-menthol | about 17.74 |
| l) pulegone | about 17.28 |
| m) piperitone | about 17.26 |
| n) menthyl acetate | about 15.98 |
| o) caryophyllene | about 16.22; | and further wherein the flavoring agent is contained to the chewing gum between about 0.5 to about 8.0 weight percent of the gum.

10. The chewing gum of claim 7 wherein the flavoring agent is selected from at least one of the following ingredients:

| Flavoring Ingredient | δ, Solubility Parameter |
|---|---|
| a) α-pinene | about 14.69 |
| b) β-pinene | about 14.65 |
| c) α-terpineol | about 17.63 |
| d) p-cymene | about 16.44 |
| e) 1,8-cineol/d-limonene | about 14.94/15.27 |
| f) δ-terpinene | about 15.61 |
| g) l-menthone | about 16.43 |
| h) isomenthone | about 16.43 |
| i) menthofuran | about — |
| j) neomenthol | about 17.74 |
| k) l-menthol | about 17.74 |
| l) pulegone | about 17.28 |
| m) piperitone | about 17.26 |
| n) menthyl acetate | about 15.98 |
| o) caryophyllene | about 16.22 |

11. The chewing gum of claim 8 wherein the flavoring agent is selected from at least one of the following ingredients:

| Flavoring Ingredient | δ, Solubility Parameter |
|---|---|
| a) α-pinene | about 14.69 |
| b) β-pinene | about 14.65 |
| c) α-terpineol | about 17.63 |
| d) p-cymene | about 16.44 |
| e) 1,8-cineol/d-limonene | about 14.94/15.27 |
| f) δ-terpinene | about 15.61 |
| g) l-menthone | about 16.43 |
| h) isomenthone | about 16.43 |
| i) menthofuran | about — |
| j) neomenthol | about 17.74 |
| k) l-menthol | about 17.74 |
| l) pulegone | about 17.28 |
| m) piperitone | about 17.26 |
| n) menthyl acetate | about 15.98 |
| o) caryophyllene | about 16.22 |

12. A petroleum wax-free chewing gum comprising:

| Ingredients | Weight Percent |
|---|---|
| wax-free gum base | about 10–90% |
| sweeteners | about 0.001–70% |
| flavoring agents | about 0.01–10% |
| binders/bulking agents | about 5–75% | wherein the wax-free gum base has an average weighted Solubility Parameter of from 16–21; and wherein the wax-free gum base comprises:

| Ingredients | Weight Percent |
|---|---|
| elastomers | about 10–90% |
| elastomer plasticizer | about 1.0–50% |
| vinyl polymers | about 1.0–40% |
| fillers/texturizers | about 1.0–40% |
| fats, oils, and softeners | about 1.0–40% |
| natural waxes | about 0–5%; | and further wherein the sweeteners may be high-intensity sweeteners, low-intensity sweeteners, or admixtures thereof; and further wherein the binders/bulking agents are selected from at least one from the group:

corn syrup, hydrogenated starch hydrolysate, sucrose syrups, dextrose syrups, invert sugar syrups, and oligosaccharides having an average degree of polymerization of at least 3; and further, wherein the flavoring agent comprises at least 5 weight percent of a flavoring ingredient having a Solubility Parameter at least 0.5 S.P.U.s greater than, or less than, the average weighted Solubility Parameter of the wax-free gum base.

13. The chewing gum of claim 12 wherein the sweeteners are high-intensity sweeteners selected from at least one of the group consisting of:
a) sucralose
b) aspartame
c) acesulfame K and/or salts thereof
d) alitame
e) saccharin and/or salts thereof
g) glycyrrhizin
h) dihydrochalcones
i) thaumatin, and
j) monellin.

14. The chewing gum of claim 12 wherein the flavoring agents contain at least 5 weight percent of at least one of the ingredients selected from the group:

| Flavoring Ingredient | δ, Solubility Parameter |
|---|---|
| a) α-pinene | about 14.69 |
| b) β-pinene | about 14.65 |
| c) α-terpineol | about 17.63 |
| d) p-cymene | about 16.44 |
| e) 1,8-cineol/d-limonene | about 14.94/15.27 |
| f) δ-terpinene | about 15.61 |
| g) l-menthone | about 16.43 |
| h) isomenthone | about 16.43 |
| i) menthofuran | about — |
| j) neomenthol | about 17.74 |
| k) l-menthol | about 17.74 |
| l) pulegone | about 17.28 |
| m) piperitone | about 17.26 |
| n) menthyl acetate | about 15.98 |
| o) caryophyllene | about 16.22; | and further wherein the flavoring agent is contained in the chewing gum between about 0.5 to about 8.0 weight percent of the gum.

15. The chewing gum of claim 13 wherein the flavoring agents contain at least 5 weight percent of at least one of the ingredients selected from the group:

| Flavoring Ingredient | $\delta$, Solubility Parameter |
|---|---|
| a) α-pinene | about 14.69 |
| b) β-pinene | about 14.65 |
| c) α-terpineol | about 17.63 |
| d) p-cymene | about 16.44 |
| e) 1,8-cineol/d-limonene | about 14.94/15.27 |
| f) δ-terpinene | about 15.61 |
| g) 1-menthone | about 16.43 |
| h) isomenthone | about 16.43 |
| i) menthofuran | about — |
| j) neomenthol | about 17.74 |
| k) 1-menthol | about 17.74 |
| l) pulegone | about 17.28 |
| m) piperitone | about 17.26 |
| n) menthyl acetate | about 15.98 |
| o) caryophyllene | about 16.22; | and further wherein the flavoring agent is contained in the chewing gum between about 0.5 to about 8.0 weight percent of the gum.

16. A petroleum wax-free flavored chewing gum with enhanced flavor release comprising a petroleum wax-free chewing gum base, containing at least one percent elastomer plasticizer sweeteners, bulking/binding agents, and flavoring agents, wherein at least 5 weight percent of the flavoring agent has a Solubility Parameter, defined by $$\delta = \sqrt{\frac{\rho \Sigma E_i}{M.W}}$$

wherein;

$\delta$ = Solubility Parameter for ingredient i
$\rho$ = density of ingredient i
M.W. = molecular weight of ingredient i
E = molar attraction constant of each chemical moiety of ingredient i; and wherein the Solubility Parameter is at least 0.5 S.P.U.s greater than, or less than, the average weighted Solubility Parameter of the wax-free gum base.

17. A petroleum wax-free flavored chewing gum having fast release of flavor comprising:

| Ingredients | Weight Percent |
|---|---|
| wax-free gum base containing at least one percent elastomer plasticizer | about 10–90 |
| sweeteners | about 0.001–70 |
| flavoring agents | about 0.01–10 |
| binders/bulking agents | about 5–75 | wherein at least 5 weight percent of the flavoring agent has a Solubility Parameter, defined by $$\delta = \sqrt{\frac{\rho \Sigma E_i}{M.W}}$$

wherein;

$\delta$ = Solubility Parameter for ingredient i
$\rho$ = density of ingredient i
M.W. = molecular weight of ingredient i
E = molar attraction constant of each chemical moiety of ingredient i, and wherein the Solubility Parameter is at least 0.5 S.P.U.s greater than, or less than, the average weighted Solubility Parameter of the wax-free gum base.

18. The petroleum wax-free gum of claim 16 wherein the wax-free gum base comprises:

| Ingredients | Weight Percent |
|---|---|
| a) elastomers | about 10–90 |
| b) elastomer plasticizer | about 1.0–50 |
| c) fillers/texturizers | about 0.5–40 |
| d) vinyl polymers | about 0.5–40 |
| e) fats, oils, and softeners | about 1.0–40 |
| f) emulsifiers, colorants, dyes, antioxidants, whiteners, pharmaceuticals, and | about 0.1–5.0 |
| g) natural waxes. | about 0.0–5.0; | and further, wherein the wax-free gum base has an average weighted Solubility Parameter ranging between about 16.0 and 21.0.

19. The petroleum wax-free gum of claim 17 wherein the wax-free gum base comprises:

| Ingredients | Weight Percent |
|---|---|
| a) elastomers | about 10–90 |
| b) elastomer plasticizer | about 1.0–50 |
| c) fillers/texturizers | about 0.5–40 |
| d) vinyl polymers | about 0.5–40 |
| e) fats, oils, and softeners | about 1.0–40 |
| f) emulsifiers, colorants, dyes, antioxidants, whiteners, pharmaceuticals, and | about 0.1–5.0 |
| g) natural waxes. | about 0.0–5.0; | and further, wherein the wax-free gum base has an average weighted Solubility Parameter ranging between about 16.0 and 21.0.

20. The petroleum wax-free gum of claim 17 having a gum base with an average weighted Solubility Parameter from between 17.0 and about 20.0.

21. The petroleum wax-free gum of claim 18 wherein at least 10 weight percent of at least one flavoring agent contained therein has a Solubility Parameter which is at least 0.5 S.P.U.s greater than, or less than, the average weighted Solubility Parameter of the gum base.

22. The petroleum wax-free chewing gum of claim 18 wherein at least 25 weight percent of at least one flavoring agent contained therein has a Solubility Parameter which is at least 0.5 S.P.U.s greater than, or less than, the average weighted Solubility Parameter of the gum base.

23. The petroleum wax-free chewing gum of claim 18 wherein at least 10 weight percent of the flavoring agent has a Solubility Parameter at least 1.0 S.P.U.s greater than, or less than, the average weighted Solubility Parameter of the wax-free gum base.

24. The chewing gum of claim 23 wherein the gum base has an average weighted Solubility Parameter ranging between about 17.0 and 20.0.

25. The chewing gum of claim 17 wherein the flavoring agent is selected from at least one of the following ingredients:

| Flavoring Ingredient | δ, Solubility Parameter |
|---|---|
| a) α-pinene | about 14.69 |
| b) β-pinene | about 14.65 |
| c) α-terpineol | about 17.63 |
| d) p-cymene | about 16.44 |
| e) 1,8-cineol/d-limonene | about 14.94/15.27 |
| f) δ-terpinene | about 15.61 |
| g) l-menthone | about 16.43 |
| h) isomenthone | about 16.43 |
| i) menthofuran | about — |
| j) neomenthol | about 17.74 |
| k) l-menthol | about 17.74 |
| l) pulegone | about 17.28 |
| m) piperitone | about 17.26 |
| n) menthyl acetate | about 15.98 |
| o) caryophyllene | about 16.22 |

26. The chewing gum of claim 18 wherein the flavoring agent is selected from at least one of the following ingredients:

| Flavoring Ingredient | δ, Solubility Parameter |
|---|---|
| a) α-pinene | about 14.69 |
| b) β-pinene | about 14.65 |
| c) α-terpineol | about 17.63 |
| d) p-cymene | about 16.44 |
| e) 1,8-cineol/d-limonene | about 14.94/15.27 |
| f) δ-terpinene | about 15.61 |
| g) l-menthone | about 16.43 |
| h) isomenthone | about 16.43 |
| i) menthofuran | about — |
| j) neomenthol | about 17.74 |
| k) l-menthol | about 17.74 |
| l) pulegone | about 17.28 |
| m) piperitone | about 17.26 |
| n) menthyl acetate | about 15.98 |
| o) caryophyllene | about 16.22 |

27. The chewing gum of claim 19 wherein the flavoring agent is selected from at least one of the following ingredients:

| Flavoring Ingredient | δ, Solubility Parameter |
|---|---|
| a) α-pinene | about 14.69 |
| b) β-pinene | about 14.65 |
| c) α-terpineol | about 17.63 |
| d) p-cymene | about 16.44 |
| e) 1,8-cineol/d-limonene | about 14.94/15.27 |
| f) δ-terpinene | about 15.61 |
| g) l-menthone | about 16.43 |
| h) isomenthone | about 16.43 |
| i) menthofuran | about — |
| j) neomenthol | about 17.74 |
| k) l-menthol | about 17.74 |
| l) pulegone | about 17.28 |
| m) piperitone | about 17.26 |
| n) menthyl acetate | about 15.98 |
| o) caryophyllene | about 16.22 |

28. The chewing gum of claim 20 wherein the flavoring agent is selected from at least one of the following ingredients:

| Flavoring Ingredient | δ, Solubility Parameter |
|---|---|
| a) α-pinene | about 14.69 |
| b) β-pinene | about 14.65 |
| c) α-terpineol | about 17.63 |
| d) p-cymene | about 16.44 |
| e) 1,8-cineol/d-limonene | about 14.94/15.27 |
| f) δ-terpinene | about 15.61 |
| g) l-menthone | about 16.43 |
| h) isomenthone | about 16.43 |
| i) menthofuran | about — |
| j) neomenthol | about 17.74 |
| k) l-menthol | about 17.74 |
| l) pulegone | about 17.28 |
| m) piperitone | about 17.26 |
| n) menthyl acetate | about 15.98 |
| o) caryophyllene | about 16.22 |

29. The chewing gum of claim 21 wherein the flavoring agent is selected from at least one of the following ingredients:

| Flavoring Ingredient | δ, Solubility Parameter |
|---|---|
| a) α-pinene | about 14.69 |
| b) β-pinene | about 14.65 |
| c) α-terpineol | about 17.63 |
| d) p-cymene | about 16.44 |
| e) 1,8-cineol/d-limonene | about 14.94/15.27 |
| f) δ-terpinene | about 15.61 |
| g) l-menthone | about 16.43 |
| h) isomenthone | about 16.43 |
| i) menthofuran | about — |
| j) neomenthol | about 17.74 |
| k) l-menthol | about 17.74 |
| l) pulegone | about 17.28 |
| m) piperitone | about 17.26 |
| n) menthyl acetate | about 15.98 |
| o) caryophyllene | about 16.22 |

30. The chewing gum of claim 24 wherein the flavoring agent is selected from at least one of the following ingredients:

| Flavoring Ingredient | δ, Solubility Parameter |
|---|---|
| a) α-pinene | about 14.69 |
| b) β-pinene | about 14.65 |
| c) α-terpineol | about 17.63 |
| d) p-cymene | about 16.44 |
| e) 1,8-cineol/d-limonene | about 14.94/15.27 |
| f) δ-terpinene | about 15.61 |
| g) l-menthone | about 16.43 |
| h) isomenthone | about 16.43 |
| i) menthofuran | about — |
| j) neomenthol | about 17.74 |
| k) l-menthol | about 17.74 |
| l) pulegone | about 17.28 |
| m) piperitone | about 17.26 |
| n) menthyl acetate | about 15.98 |
| o) caryophyllene | about 16.22 |

31. The chewing gum of claim 8 wherein at least one flavoring ingredient is selected from the group consisting of:
 a) d-limonene
 b) l-menthone
 c) isomenthone
 d) neomenthol
 e) l-menthol
 f) menthyl acetate, and is present as at least 5 weight percent of the total flavoring agent.

32. The chewing gum of claim 13 wherein at least one flavoring ingredient is selected from the group consisting of:
- a) d-limonene
- b) l-menthone
- c) isomenthone
- d) neomenthol
- e) l-menthol
- f) menthyl acetate, and is present as at least 5 weight percent of the total flavoring agent.

33. The chewing gum of claim 14 wherein at least one flavoring ingredient is selected from the group consisting of:
- a) d-limonene
- b) l-menthone
- c) isomenthone
- d) neomenthol
- e) l-menthol
- f) menthyl acetate, and is present as at least 5 weight percent of the total flavoring agent.

34. The chewing gum of claim 30 wherein at least one of the flavoring ingredients is present as at least 5 weight percent of the total flavoring agent, and further wherein the total flavoring agent is present in the chewing gums at between 0.5 weight percent and about 8.0 weight percent.

35. A petroleum wax-free flavored chewing gum comprising:

| Ingredients | Average Weighted $\delta$, Solubility Parameter | Weight Percent |
| --- | --- | --- |
| Wax-free gum base having at least one percent elastomer plasticizer | 17.0–20.0 | about 15–75 |
| Sweeteners | — | about 0.001–50 |
| Flavoring agents | 14.0–18.0 | about 0.01–10.0 |
| Binders/bulking agents | — | about 10–65 | wherein at least 5 weight percent of the flavoring agent is a flavoring ingredient having a Solubility Parameter which is 0.5 Solubility Parameter Units greater than, or less than, the average weighted Solubility Parameter of the wax-free gum base; and further, wherein the binder/bulking agents are selected from at least one of the group consisting of:
- a) corn syrup,
- b) hydrogenated starch hydrolysates,
- c) sucrose syrups,
- d) invert sugar syrups, and
- e) oligosaccharides having an average degree of polymerization ranging between about 3 and 50; and further wherein the sweeteners are selected from at least one of the group consisting of:
- a) dextrose
- b) sucrose
- c) levulose
- d) maltose
- e) dextrin
- f) dried invert sugars
- g) fructose
- h) galactose
- i) corn syrup solids
- j) sorbitol
- k) mannitol
- l) xylitol
- m) maltitol
- n) sucralose
- o) aspartame
- p) acesulfame K and salts thereof
- q) alitame
- r) saccharin and salts thereof
- s) cyclamic acid and salts thereof
- t) glycyrrhizin
- u) dihydrochalcones
- v) thaumatin, and
- w) monellin.

36. The chewing gum of claim 35 wherein the wax-free gum base comprises:

| Ingredients | $\delta$, Solubility Parameter | Weight Percent |
| --- | --- | --- |
| Elastomer | 16.0–21.0 | about 15–75 |
| Elastomer plasticizer | 17.0–21.0 | about 5–40.0 |
| Filler/texturizer | — | about 2.0–30.0 |
| Vinyl polymers | 16.0–20.0 | about 2.0–30.0 |
| Fats, oils, and softeners | 17.5–22.0 | about 5.0–35.0 |
| Emulsifiers, colorants, dyes, whiteners, antioxidants, and pharmaceuticals | — | about 0.1–10.0 |
| Natural waxes | 15.0–17.5 | about 0.0–3.5 | wherein the wax-free gum base has an average weighted Solubility Parameter ranging from about 17.0 and 20.0.

37. The chewing gum of claim 36 wherein the sweeteners are selected from sucralose, aspartame, acesulfame K and salts thereof, alitame, saccharin and salts thereof, cyclamic aid and salts thereof, glycyrrhizin, dihydrochalcones, thaumatin, monellin, or admixtures thereof.

38. The chewing gums of claim 36 wherein the binder/bulking agents are selected from binders containing at least 35 weight percent oligosaccharides selected from the group consisting of:
  fructooligosaccharides
  oligofructose
  polydextrose
  indigestible dextrins
  isomaltulose oligosaccharides and
  mixtures thereof.

39. The chewing gums of claim 37 wherein the binder/bulking agents are selected from binders containing at least 35 weight percent oligosaccharides selected from the group consisting of:
  fructooligosaccharides
  oligofructose
  polydextrose
  indigestible dextrins
  isomaltulose oligosaccharides, and
  mixtures thereof.

40. The chewing gums of claim 35 wherein the flavoring agent is selected from at least one of the following ingredients:

| Flavoring Ingredient | $\delta$, Solubility Parameter |
| --- | --- |
| a) α-pinene | about 14.69 |
| b) β-pinene | about 14.65 |
| c) α-terpineol | about 17.63 |

-continued

| Flavoring Ingredient | δ, Solubility Parameter |
| --- | --- |
| d) p-cymene | about 16.44 |
| e) 1,8-cineol/d-limonene | about 14.94/15.27 |
| f) δ-terpinene | about 15.61 |
| g) 1-menthone | about 16.43 |
| h) isomenthone | about 16.43 |
| i) menthofuran | about — |
| j) neomenthol | about 17.74 |
| k) 1-menthol | about 17.74 |
| l) pulegone | about 17.28 |
| m) piperitone | about 17.26 |
| n) menthyl acetate | about 15.98 |
| o) caryophyllene | about 16.22 |

41. The chewing gum of claim 1 which is a bubble gum.

42. The chewing gum of claim 12 which is a bubble gum.

43. The chewing gum of claim 16 which is a bubble gum.

44. The chewing gum of claim 18 which is a bubble gum.

45. The chewing gum of claim 35 which is a bubble gum.

46. The chewing gums of claim 12 or 35 wherein
a) the elastomers are selected from:
polyisobutylene having a weight average molecular weight of from 10,000 to about 200,000;
polyisobutylene having a weight average molecular weight of from 10,000 to about 200,000;
styrene-butadiene copolymers having a styrene to butadiene mole ratio of from 3:1 to 1:3 and having a weight average molecular weight from about 10,000 to about 200,000;
isobutylene-isoprene copolymers having an isobutylene to isoprene mole ratio of from about 20:1 to 1:20 and a weight average molecular weight of from about 10,000 to about 200,000; or
any mixtures thereof; and further
b) the elastomer plasticizers are selected from the group consisting of natural rosin esters, synthetic terpene resins, ester gums, or mixtures thereof; and further
c) the fillers and texturizers are selected from the group consisting of magnesium and calcium carbonates, ground limestone, magnesium and aluminum silicates, clays, alumina, silica, talc, titanium oxide, any of the calcium phosphates, cellulosics, or combinations thereof; and further
d) the fats, oils, and softeners are selected from the group:
tallow;
hydrogenated or partially hydrogenated tallow;
hydrogenated or partially hydrogenated vegetable oils;
vegetable oils;
cocoa butter;
glycerol monostearate;
glycerol triacetate;
lecithin;
mono-, di-, and triglycerides;
acetylated monoglycerides;
fatty acids, or
mixtures thereof.

47. A method of improving flavor release from a wax-free chewing gum which comprises formulating the chewing gum with a wax free gum base containing at least one percent elastomer plasticizer and having an average weighted Solubility Parameter ranging from about 16.0 to about 21.0 S.P.U.s and a flavoring agent, at least 5 weight percent of which has a Solubility Parameter at least 0.5 S.P.U.s greater than, or less than, the average weighted Solubility Parameter of the gum base.

48. The method of claim 47 wherein the flavoring agent has at least 10 weight percent having a Solubility Parameter at least 1.0 S.P.U. greater than, or less than, the average weighted Solubility Parameter of the gum base.

49. The method of claim 47 wherein the wax-free gum base has an average weighted Solubility Parameter ranging from about 17.0 to about 20.0 S.P.U.s and the flavoring agent comprises at least 10 weight percent flavoring ingredients having Solubility Parameters ranging from 14.0 to about 18.0 and being 0.5 S.P.U.s greater than, or less than, the average weighted Solubility Parameter of the gum base.

50. The method of claim 47 wherein the wax-free gum base comprises:

| Ingredients | Weight Percent |
| --- | --- |
| elastomers | about 10-90 |
| elastomer plasticizer | about 5-90 |
| vinyl polymers | about 0.5-40 |
| fillers | about 0.5-40 |
| fats, oils, softeners | about 1-40 |
| emulsifiers, colorants, whiteners, antioxidants | about 0.1-15 |
| natural waxes | about 0-5; | said gum base being formulated to have an average weighted Solubility Parameter ranging from about 17.0 to about 20.0 S.P.U.s.

51. The method of claim 50 wherein the flavoring agent comprises at least 10 weight percent of at least one flavoring ingredient having a Solubility Parameter at least 0.5 S.P.U.s greater than, or less than, the average weighted Solubility Parameter of the gum base.

52. The method of claim 50 wherein the flavoring agent comprises at least 10 weight percent of at least one flavoring ingredient having a Solubility Parameter at least 1.0 S.P.U.s greater than, or less than, the average weight Solubility Parameter of the gum base.

53. The method of claim 50 wherein at least 10 weight percent of the flavoring agent has a Solubility Parameter 1.0 S.P.U. less than the average weighted Solubility Parameter of the gum base.

54. A method of manufacturing a shaped petroleum wax-free chewing gum which comprises:
a) admixing a wax-free gum base containing at least one percent elastomer plasticizer to have average weighted Solubility Parameter ranging from about 16.0 to about 21.0;
b) adding thereto, and mixing therewith, sweeteners, binding agents, and bulking agents;
c) adding thereto, and mixing therewith, flavoring agents, at least 5 weight percent of which have a Solubility Parameter 0.5 greater than, or less than, the average weighted Solubility Parameter of the gum base, thereby forming a molten flavored chewing gum; and then
d) casting the molten flavored chewing gum into a desired shape, then cooling to form a shaped wax-free chewing gum.

55. The method of claim 54 wherein the shaped wax-free chewing gum is a bubble gum.

56. The method of claim 54 wherein the wax-free gum base has a weighted average Solubility Parameter ranging from about 17.0 to about 20.0; and further wherein the flavoring agent comprises at least one flavoring ingredient having a Solubility Parameter ranging from about 0.5 S.P.U.s greater than, or less than, the average weighted Solubility Parameter of the gum base.

57. The method of claim 56 wherein the flavoring agent has at least one flavoring ingredient with a Solubility Parameter ranging from 14.0–18.05 S.P.U.s.

58. The method of claim 54 wherein the wax-free gum base comprises:

| Ingredients | Weight Percent |
|---|---|
| elastomers | about 10–90% |
| elastomer plasticizer | about 5–90% |
| vinyl polymers | about 1–40% |
| fats, oils, softeners | about 1–40% |
| fillers and texturizers | about 1–35% |
| emulsifiers, colorants, whiteners, antioxidants | about 0.1–15% |
| natural waxes | about 0.0–5%; | said gum base having an average weighted Solubility Parameter ranging from about 17.0–20.00 S.P.U.s.

59. The method of claim 58 wherein the sweeteners are selected from high-intensity sweeteners selected from at least one of the group consisting of sucralose, aspartame, acesulfame K, alitame, saccharin, cyclamic acid, glycyrrhizin, dihydrochalcones, thaumatin, and monellin; and further wherein the binding and bulking agents are selected from at least one of the group consisting of:

a) corn syrup,
    b) hydrogenated starch hydrolysates,
    c) invert sugar syrups, and
    d) oligosaccharides having an average degree of polymerization ranging between about 3 and 50; and further wherein the flavoring agent comprises at least one ingredient from the group consisting of:

| Flavoring Ingredient | $\delta$, Solubility Parameter |
|---|---|
| a) $\alpha$-pinene | about 14.69 |
| b) $\beta$-pinene | about 14.65 |
| c) $\alpha$-terpineol | about 17.63 |
| d) p-cymene | about 16.44 |
| e) 1,8-cineol/d-limonene | about 14.94/15.27 |
| f) $\delta$-terpinene | about 15.61 |
| g) l-menthone | about 16.43 |
| h) isomenthone | about 16.43 |
| i) menthofuran | about — |
| j) neomenthol | about 17.74 |
| k) l-menthol | about 17.74 |
| l) pulegone | about 17.28 |
| m) piperitone | about 17.26 |
| n) menthyl acetate | about 15.98 |
| o) caryophyllene | about 16.22 |

* * * * *

UNITED STATES PATENT AND TRADEMARK OFFICE
CERTIFICATE OF CORRECTION

PATENT NO. : 5,286,501
DATED : February 15, 1994
INVENTOR(S) : Joo H. Song et al.

It is certified that error appears in the above-identified patent and that said Letters Patent is hereby corrected as shown below:

In column 3, lines 55-58, delete "[calories/cm$^3$[$^{1/2}$/mole, as in Table 1 below, or preferably as 1 unit having the dimensionality of [Joules/m$^3$[$^{1/2}$ × 10$^{-3}$/mole." and substitute --(calories/cm$^3$)$^{1/2}$, as in Table 1 below, or preferably as one unit having the dimensionality of (Joules/m$^3$)$^{1/2}$ × 10$^{-3}$, as used herein.--.

In column 4, approximately line 5, in TABLE 1, delete "Molar attraction constants E, (cal/cm$^3$)$^{1/2}$/mole (Hoy 1970)$^*$" and substitute --Molar attraction constants E, (cal·cm$^3$)$^{1/2}$/mole (Hoy 1970)$^*$--.

UNITED STATES PATENT AND TRADEMARK OFFICE
CERTIFICATE OF CORRECTION

PATENT NO. : 5,286,501
DATED : February 15, 1994
INVENTOR(S) : Joo H. Song et al.

It is certified that error appears in the above-identified patent and that said Letters Patent is hereby corrected as shown below:

In column 4, approximately lines 22-24, in TABLE 1, delete "*Table 1 Molar attraction constants are given in $[calories/cm^3]^{1/2}/mole$. The Molar attraction constants used to calculate Solubility Parameters in the later tabular presentation are given in $(Joules/m^3)^{1/2} \times 10^{-3}/mole$." and substitute --*Table 1 Molar attraction constants are given in $(calories \cdot cm^3)^{1/2}/mole$. The Molar attraction constants used to calculate solubility parameters in the later tabular presentation are given in $(Joules \cdot m^3)^{1/2} \times 10^{-3}/mole$.--.

In column 6, line 12, delete "$[J/m^3]^{1/2} \times 10^{-3}/mole$," and substitute --$(J/m^3)^{1/2} \times 10^{-3}$,--.

In column 6, line 14, delete "$1 [J/m^3[^{1/2} \times 10^{-3}/mole$." and substitute --$1(J/m^3)^{1/2} \times 10^{-3}$.--.

UNITED STATES PATENT AND TRADEMARK OFFICE
CERTIFICATE OF CORRECTION

PATENT NO. : 5,286,501
DATED : February 15, 1994
INVENTOR(S) : Joo H. Song et al.

It is certified that error appears in the above-identified patent and that said Letters Patent is hereby corrected as shown below:

In column 7, lines 22-23, delete "or S.P.U.)." and substitute --(or S.P.U.).--.

In column 8, line 50, delete "1 0 S.P.U." and substitute --1.0 S.P.U.--.

In column 12, line 35, in TABLE 3, delete "7.5" and substitute --75--.

In column 15, line 5, delete "$ln((-F_f)=a+bx+cy+dz$" and substitute --$ln(-R_f)=a+bx+cy+dz$--.

In column 15, approximately lines 10-12, delete the following:

"x = $\sum \delta$ for elastomers/polymers
Y = $\sum \delta$ for waves
z = $\sum \delta$ for other ingredients"

and substitute the following:

--x = $\sum \Delta\delta$ for elastomers/polymers
Y = $\sum \Delta\delta$ for waxes
z = $\sum \Delta\delta$ for other ingredients--.

UNITED STATES PATENT AND TRADEMARK OFFICE
CERTIFICATE OF CORRECTION

PATENT NO. : 5,286,501
DATED : February 15, 1994
INVENTOR(S) : Joo H. Song et al.

It is certified that error appears in the above-identified patent and that said Letters Patent is hereby corrected as shown below:

In column 15, line 16, delete "ad" and substitute --and--.

In column 15, line 21, delete "1-methal" and substitute --1-menthol--.

In column 16, approximately line 10, in TABLE 14, delete "TABLE 14" and substitute --TABLE 13--.

In column 16, line 35, after the second occurrence of "the" insert --gum base--.

In column 16, line 64, delete "13 and 14" and substitute --12 and 13--.

In column 20, line 24, delete "now" and substitute --no--.

In the Claims

In claim 8, column 24, line 36, delete "bulkling" and substitute --bulking--.

In claim 8, column 24, line 63, delete "slitame" and substitute --alitame--.

UNITED STATES PATENT AND TRADEMARK OFFICE
CERTIFICATE OF CORRECTION

PATENT NO. : 5,286,501
DATED : February 15, 1994
INVENTOR(S) : Joo H. Song et al.

It is certified that error appears in the above-identified patent and that said Letters Patent is hereby corrected as shown below:

In claim 13, column 26, line 44, insert --f) cyclamic acid and/or salts thereof--.

In claim 16, column 27, line 30, delete "elastomer plasticizer sweeteners," and substitute --elastomer plasticizer, sweeteners,--.

In claim 16, column 27, approximately lines 35-38, delete the following:

$$``\delta = \sqrt{\frac{\rho \Sigma E_i}{M.W}}\textrm{''}$$

and substitute the following:

$$--\delta = \frac{\rho \Sigma E_i}{M.W.}--.$$

UNITED STATES PATENT AND TRADEMARK OFFICE
CERTIFICATE OF CORRECTION

PATENT NO.  : 5,286,501
DATED       : February 15, 1994
INVENTOR(S) : Joo H. Song et al.

It is certified that error appears in the above-identified patent and that said Letters Patent is hereby corrected as shown below:

In claim 37, column 32, line 37, delete "aid" and substitute --acid--.

Signed and Sealed this

Twenty-seventh Day of July, 1999

Attest:

Q. TODD DICKINSON

*Attesting Officer*       *Acting Commissioner of Patents and Trademarks*